US008230384B1

(12) United States Patent
Krishnan et al.

(10) Patent No.: US 8,230,384 B1

(45) Date of Patent: Jul. 24, 2012

(54) TECHNIQUES FOR GENERATING AND PROCESSING A SCHEMA INSTANCE

(75) Inventors: Sriram Krishnan, Shrewsbury, MA (US); Russell R. Laporte, Webster, MA (US)

(73) Assignee: EMC Corporation, Hopkinton, MA (US)

( * ) Notice: Subject to any disclaimer, the term of this patent is extended or adjusted under 35 U.S.C. 154(b) by 1631 days.

(21) Appl. No.: 11/393,236

(22) Filed: Mar. 30, 2006

(51) Int. Cl.
*G06F 9/44* (2006.01)
*G06F 7/00* (2006.01)
*G06F 17/30* (2006.01)

(52) U.S. Cl. ........ 717/100; 707/601; 707/602; 707/809; 707/810

(58) Field of Classification Search ........................ None
See application file for complete search history.

(56) References Cited

U.S. PATENT DOCUMENTS 5,537,585 A * 7/1996 Blickenstaff et al. ......... 707/205
5,960,439 A * 9/1999 Hamner et al. ........... 707/103 R
6,681,223 B1 * 1/2004 Sundaresan ........................ 707/6
7,113,900 B1 * 9/2006 Hunt et al. ...................... 703/13
7,136,862 B2 * 11/2006 Mogi et al. ........................... 1/1
2002/0143949 A1 * 10/2002 Rajarajan et al. ............. 709/226
2004/0036716 A1 * 2/2004 Jordahl ......................... 345/713
2005/0223047 A1 * 10/2005 Shah et al. .................... 707/201
2005/0246389 A1 * 11/2005 Shah et al. .................... 707/200
2005/0283822 A1 * 12/2005 Appleby et al. .................. 726/1
2006/0143425 A1 * 6/2006 Igarashi et al. ............... 711/173

OTHER PUBLICATIONS

U.S. Appl. No. 11/393,545, filed Mar. 30, 2006, Sriram Krishnan, et al.

* cited by examiner

*Primary Examiner* — Emerson Puente
*Assistant Examiner* — Jonathan R Labud
(74) *Attorney, Agent, or Firm* — Muirhead and Saturnelli, LLC

(57) ABSTRACT

Described are technique for generating a configuration schema instance. A layout file is received that specifies what portion of configuration information is to be extracted from a configuration data store. The portion of configuration information is extracted from said configuration data store in accordance with said layout file. A representation of said portion of configuration information is stored in said configuration schema instance.

16 Claims, 16 Drawing Sheets

TECHNIQUES FOR GENERATING AND PROCESSING A SCHEMA INSTANCE

BACKGROUND

1. Technical Field

This application generally relates to configuration of a data storage system, and more particularly to languages and techniques used in connection with configuration of a data storage system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems, also referred to as server systems, may store and retrieve data using a storage device containing a plurality of host interface units, disk drives, and disk interface units. The host systems access the storage device through a plurality of channels provided therewith. Host systems provide data and access control information through the channels to the storage device, and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Configuration information may be associated with a data storage system. The configuration information may include information describing the physical and/or logical configuration in the data storage system. The logical configuration information may include, for example, information regarding RAID groupings, logically defined devices, and the like. There are times when it may be useful to replicate the configuration information from one data storage system such as, for example, for use in connection with configuring another data storage system. Existing techniques include manually extracting the configuration information for the data storage system from a storage location of the configuration information. Such a process is often cumbersome, time consuming and error prone.

SUMMARY OF THE INVENTION

In accordance with one aspect of the invention is a method for generating a configuration schema instance comprising: receiving a layout file specifying what portion of configuration information is to be extracted from a configuration data store; extracting said portion of configuration information from said configuration data store in accordance with said layout file; and storing a representation of said portion of configuration information in said configuration schema instance. The layout file and said configuration schema instance may have a structured hierarchical format in accordance with a defined hierarchy of configuration categories of configuration information included in said configuration data store. The defined hierarchy may include a hierarchy of logical configuration information and physical configuration information of a data storage system. The layout file may identify one or more routines which are associated with an element included in said layout file, said element corresponding to one of the configuration categories, wherein said one or more routines are invoked in connection with retrieving an instance of configuration information corresponding to said one configuration category. The one or more routines may correspond to associations between categories of said defined hierarchy, said one or more routines are invoked to traverse said defined hierarchy and retrieve instances from the configuration data store, said one or more routines include a first parameter identifying a first category and a second parameter identifying a second category, and wherein invoking said one or more routines with an instance of said first category is used to retrieve one or more instances of said second category from the configuration data store. The layout file may include properties of instances to be extracted from said configuration data store. The layout file and said configuration schema instance may include tags associated with categories of said hierarchy, said hierarchy being represented as a tree-like structure, categories of said hierarchy which are at different levels being represented in said layout file and said configuration instance using nested tags. The configuration schema instance may include configuration information identifying instances of a category from said configuration data store having a first hierarchical context in accordance with a tag included in said layout file, and wherein said tag is associated with said category and has a second hierarchical context matching said first hierarchical context.

In accordance with another aspect of the invention is a method for configuring a target data store comprising: receiving a schema instance describing information to be included in said target data store; parsing a master rules file including one or more rules; determining, for each of said one or more rules, whether there is an element included in said schema instance having a context that matches a context for said each rule; if there is an element in said schema instance having a context that matches a context for said each rule, executing said each rule in accordance with a context of said element in said schema instance; and performing operations on said target data store in accordance with said each rule to update said target data store in accordance with said schema instance. The target data store may include configuration information for a data storage system and said schema instance describes configuration information to be included in said target data store. The determining whether there is an element included in said schema instance having a context that matches a context for said each rule further may include determining whether a first hierarchical context of said each rule matches a second hierarchical context of said element. The executing said each rule in accordance with a context of said element in said schema instance may include executing said each rule using information associated with said second hierarchical context of said element and data associated with said element. The schema instance may be generated using a capture engine to capture a portion of configuration information from a source configuration data store for duplication in said target data store in accordance with a layout file indicating which portion of said configuration information is to be captured and represented in said schema instance. The one or more rules may each have a corresponding rule file and executing a rule includes utilizing a particular rules engine selected in accordance with a type of said rule file. A rule file may be implemented using a programming language or a scripting language.

In accordance with another aspect of the invention is a computer readable medium comprising code stored thereon for generating a configuration schema instance, the computer readable medium comprising code that: receives a layout file specifying what portion of configuration information is to be extracted from a configuration data store; extracts said portion of configuration information from said configuration data store in accordance with said layout file; and stores a representation of said portion of configuration information in said configuration schema instance. The layout file and said configuration schema instance may have a structured hierarchical format in accordance with a defined hierarchy of configuration categories of configuration information included in said configuration data store. The defined hierarchy may include a hierarchy of logical configuration information and physical configuration information of a data storage system. The layout file may identify one or more routines which are associated with an element included in said layout file, said element corresponding to one of the configuration categories, wherein said one or more routines are invoked in connection with retrieving an instance of configuration information corresponding to said one configuration category. The one or more routines may correspond to associations between categories of said defined hierarchy, said one or more routines are invoked to traverse said defined hierarchy and retrieve instances from the configuration data store, said one or more routines include a first parameter identifying a first category and a second parameter identifying a second category, and wherein invoking said one or more routines with an instance of said first category is used to retrieve one or more instances of said second category from the configuration data store.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Figure 1:
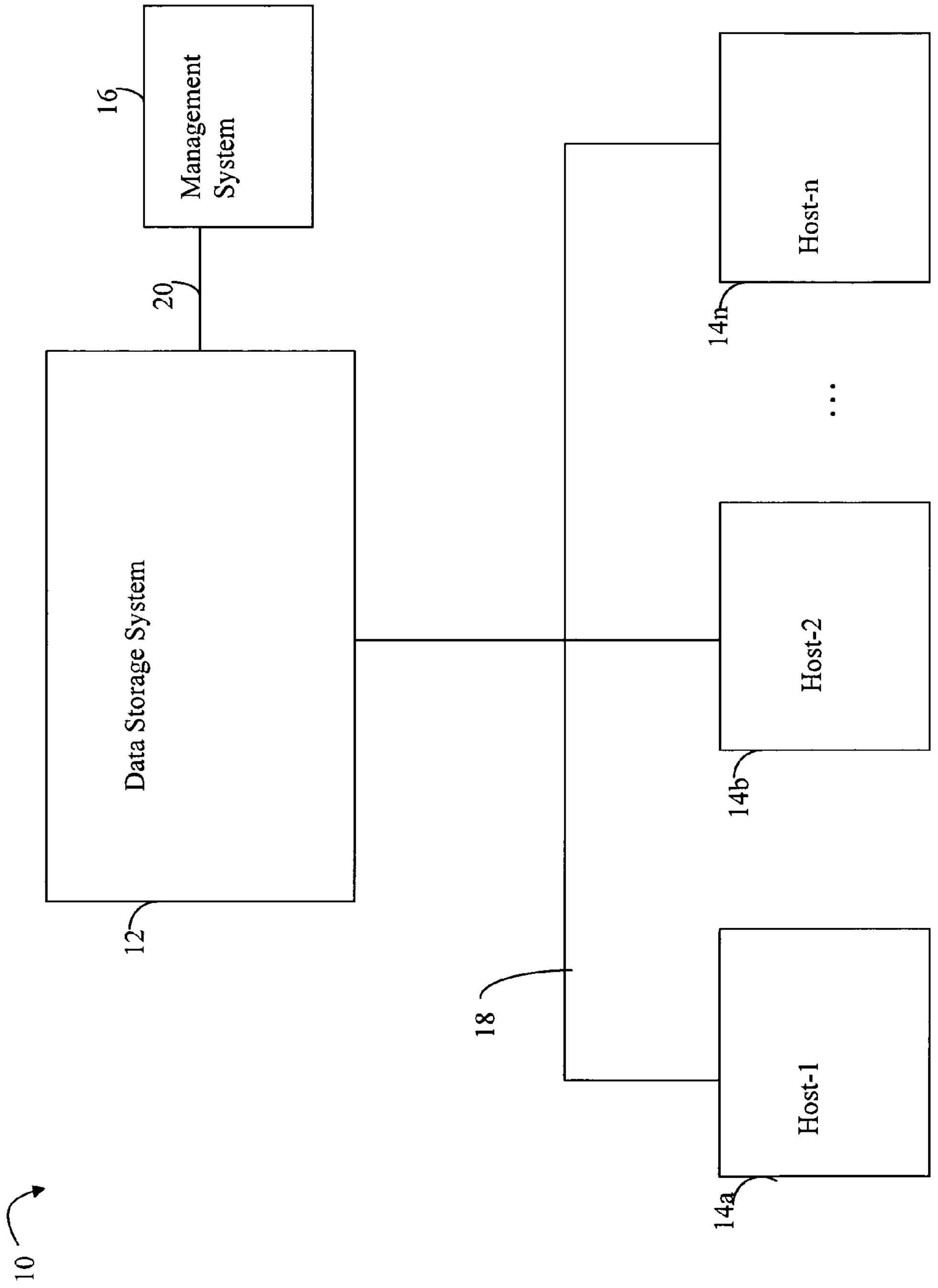
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes one or more data storage systems 12 connected to host systems 14*a*-14*n* through communication medium 18. The system 10 also includes a management system 16 connected to one or more data storage systems 12 through communication medium 20. In this embodiment of the computer system 10, the management system 16, and the N servers or hosts 14*a*-14*n* may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14*a*-14*n* may access and communicate with the data storage systems 12, and may also communicate with other components (not shown) that may be included in the computer system 10. In one embodiment, the communication medium 20 may be a LAN connection and the communication medium 18 may be an iSCSCI or fibre channel connection.

Each of the host systems 14*a*-14*n* and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14*a*-14*n* and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14*a*-14*n*, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSCI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14*a*-14*n* may issue a data request to the data storage systems 12 to perform a data operation. For example, an application executing on one of the host computers 14*a*-14*n* may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14*a*-14*n*, provide data and'access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

Figure 2:
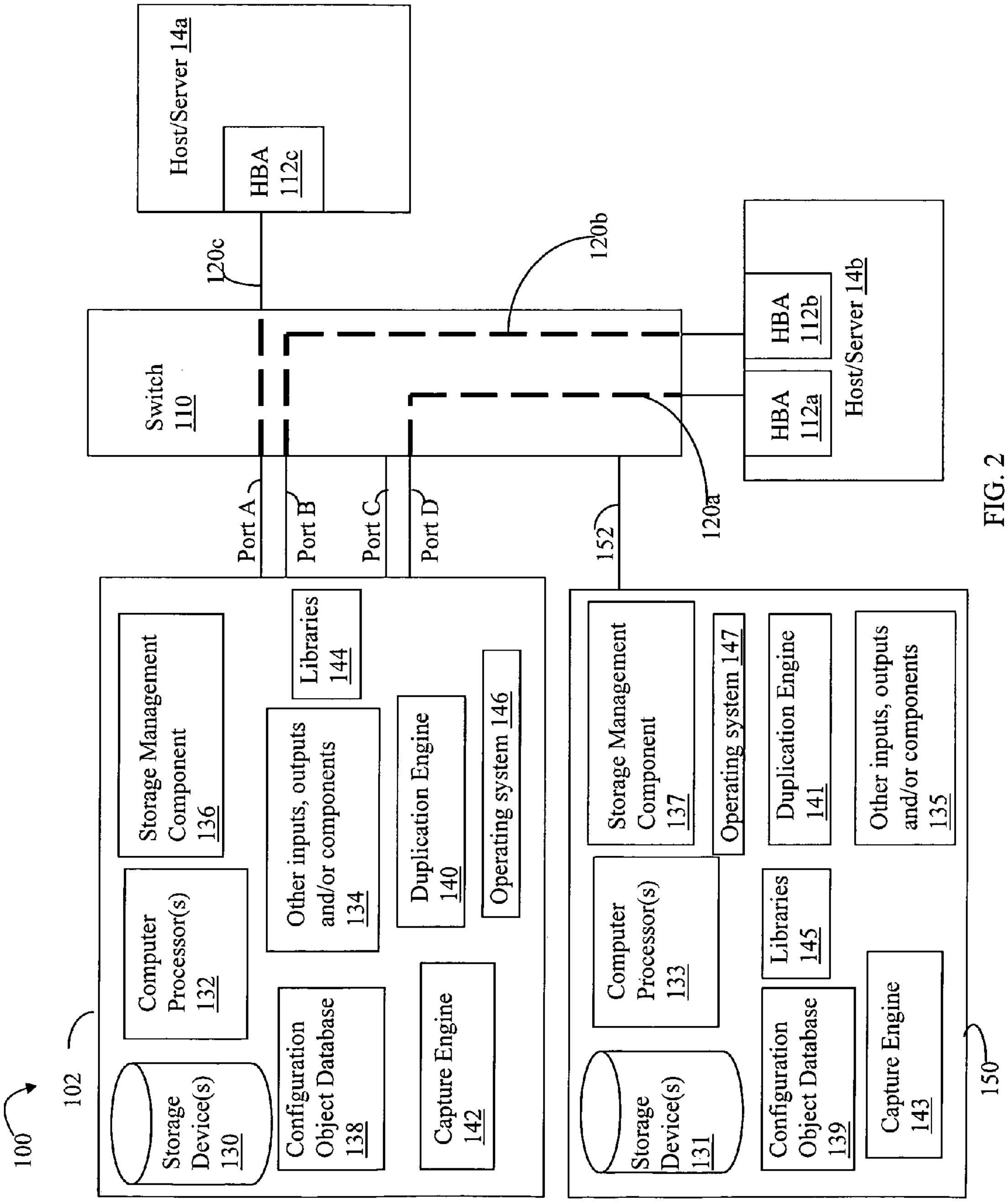
FIG. 2 illustrates in more detail components that may be included in an embodiment of the system of FIG. 1.

Referring now to FIG. 2, shown is an example 100 of components that may be used in connection with techniques described herein. The example 100 may represent components illustrated in connection of FIG. 1 configured in a storage area network (SAN). Included in the example 100 are data storage systems 102 and 150, a switch 110, and hosts or servers 14*a* and 14*b*. The switch 110 may be used in connection with facilitating communications between each of the hosts 14*a* and 14*b* and the data storage systems 102 and 150. Communications between a host and the data storage system 102 may be defined in terms of a path. Host 14*a* communicates with the data storage system 102 over a path designated as 120*c*. Path 120*c* is formed by the starting point, the HBA or host bus adapter 112*c* and the ending point, port A of the receiving data storage system 102. Host 14*b* communicates with the data storage system 102 over two paths designated as 120*a* and 120*b*. Path 120*a* is formed by the starting point, the HBA 112*a*, and the ending point, port d of the receiving data storage system 102. Path 120*b* is formed by the starting point, the HBA 112*b*, and the ending point, port b of the receiving data storage system 102. It should be noted that different HBAs from the same or different hosts may also communicate with the data storage system through a same port of the data storage system although each path 112*a*, 112*b*, and 112*c* use a different port. An embodiment may represent a path using the WWN (world wide name) of a host's HBA and the WWN of a data storage system port receiving the request. As known to those skilled in the art, a WWN is a unique number assigned by a recognized naming authority that identifies a connection or a set of connections to the network. As also known to those skilled in the art, various networking technologies that may be used in an embodiment make use of WWNs. In connection with the techniques described herein, other embodiments may use other ways in defining a path that may vary with the connectivity in each embodiment.

Each HBA may include one or more ports although in the example illustrated, each HBA has only a single port. As represented with element 152, connections between the hosts using switch 110 may be made with respect to data storage system 150. Although only two data storage system are illustrated for purposes of simplicity in illustration, each of the hosts may have connections to other data storage systems in the SAN. Additionally, each host may be connected to the data storage systems 102, 150 using other connections, including direct cabling, than as illustrated in FIG. 2.

The data storage system 102 is illustrated as including one or more storage devices 130, one or more computer processors 132, an operating system 146, a configuration object database 138, a storage management component 136, one or more libraries 144, other inputs, outputs and/or components 134, a capture engine 142 and a duplication engine 140.

An example of an embodiment of the data storage system 102 is the CLARiiON™ data storage system by EMC Corporation which includes two computer processors as represented by the element 132 although an embodiment may include a different number of processors for use in connection with the techniques described herein.

The one or more storage devices 130 may represent one or more physical devices, such as disk drives, that may be accessed in logical units (e.g., as LUNs) as described elsewhere herein. The operating system 146 may be any one of a variety of commercially available, proprietary, or other operating system capable of execution by the one or more computer processors 132 in accordance with the particulars of the data storage system 102. In one embodiment, the operating system 146 may be the Windows XP™ operating system by Microsoft Corporation.

The storage management component 136 may be a component included as part of management software for management of the data storage system. The component 136 may manage the configuration object database 138 which includes data structures of configuration information for the data storage system 102. The configuration information may include data describing a defined configuration such as the different components as well as data regarding the performance and other aspects of these components. As described elsewhere herein in more detail, the configuration information may include information regarding physical components, logical components, and other general configuration information. The physical component information may include information about physical components in the data storage system, for example, the physical disks, fans, and the like. The logical component information may include information about the logically defined components such as, for example, the LUNs, defined RAID groupings (RGs), storage groups of LUNs (SGs), and the like. Such logical component information may include what storage groups are defined and what LUNs are included in each of the SGs. Additionally, performance data regarding, for example, logical and/or physical device usage may be included in the configuration information with the appropriate physical and/or logical devices. Other general configuration information may include, for example, the WWN of the data storage system, the serial number of the data storage system, and the like.

Configuration information, such as the logical device definitions and SGs, may be defined by a data storage system manager using the management system 16. The foregoing configuration information may be received by component 136 and may be used in connection with populating the configuration object database 138. It should be noted that although a database is used in connection with storing the configuration information, it will be appreciated by those skilled in the art that other data stores or data containers may be used.

The other inputs, outputs, and/or components 134 may represent other hardware and/or software components that may be included in the data storage system 102. The element 134 may include software components such as, for example, other management software for management of the data storage system, and the like. The element 134 may also include hardware components such as, for example, memory, other storage areas, and the like. The element 134 may also include other inputs and/or outputs such as command line inputs, configuration options, and the like, as described herein.

The capture engine 142 may be used in connection with capturing the configuration, or a portion thereof, of the data storage system 102 as may be represented in the database 138. Techniques are described in more detail in following paragraphs in which the capture engine 142 may be used to extract specific information from the database 138. The extracted information may be characterized as the captured information describing the configuration of the data storage system 102 in the form of an XML schema instance. The XML schema instance may be used as an input to a duplication engine of a target data storage system, such as duplication engine 141 of data storage system 150, in order to duplicate the configuration of the source data storage system 102 on the target data storage system 150. The duplication engine 140 may be included in the source data storage system 102 although may not be used in connection with applications in which the system 102 is the source data storage system as described in this particular example. Similarly, the capture engine 143 of the target data storage system 150 may not be used in connection with applications in which the system 150 is the target data storage system as described in this particular example.

One or more libraries 144 may be used by the capture engine 142 and/or duplication engine 140 in connection with the capture and duplication processing described herein.

The components of data storage system 150 are similar to those as described in connection with the data storage system 102. It should be noted that the use of the capture engines and duplication engines in connection with the techniques described herein should not be construed as a limitation of these techniques. As described herein, the capture and duplication engines may be located and executed on a data storage system. In a different embodiment utilizing the techniques described herein, the capture and duplication engines may be stored and executed on a component residing outside the storage system. The capture and duplication engines may use the APIs providing a published interface to access components such as the object database residing on the data storage system. As another example, the techniques described herein may be used in connection with a remotely located target data storage system rather than a data storage system that may be included in the same LAN as the source data storage system.

The techniques described herein may be used in connection with capturing and duplicating a source data storage system's configuration on a target data storage system. For example, it may be desirable to duplicate one or more aspects of the logical configuration information of a source data storage system on a target data storage system. As the configuration of a data storage system increases in complexity, the benefits of the techniques described herein may be more fully appreciated by those skilled in the art.

Techniques using the components illustrated in the example 100 are described in more detail in following paragraphs.

Figure 3:
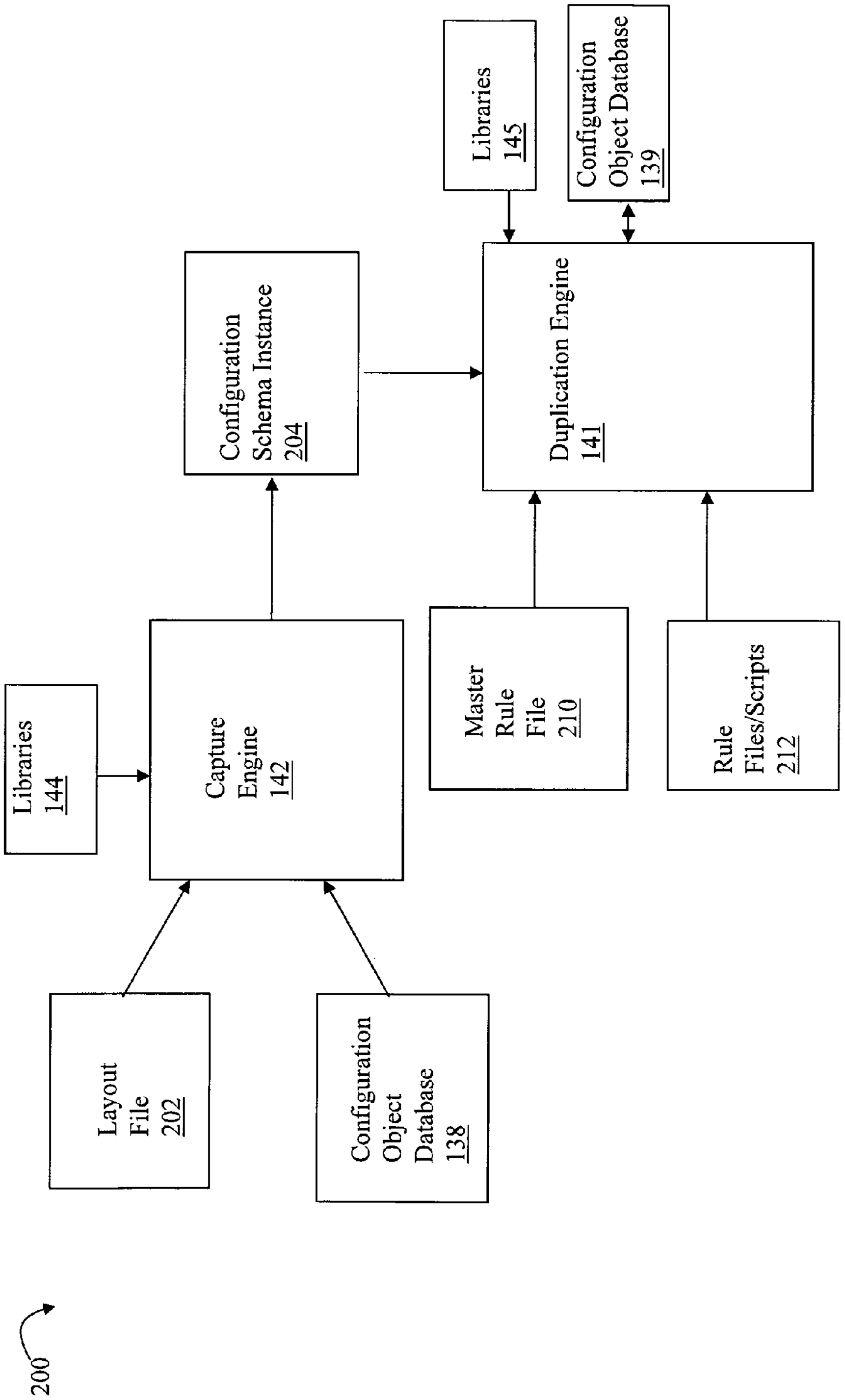
FIG. 3 is an example representation of a data flow diagram of components included in the embodiment of FIG. 2.

Referring now to FIG. 3, shown is an example illustrating data flow between components included in FIG. 2 as may be included in a source and target data storage system. The source data storage system may refer to the data storage system about which the configuration information is captured for duplication on a target data storage system. As described in connection with FIG. 2, the capture engine 142 may execute on the source data storage system, such as 102, and the duplication engine 141 may execute on the target data storage system, such as 150.

In the example 200, the capture engine 142's inputs include a source configuration object database 138, a layout file 202 and one or more libraries 144. The layout file 202 describes which elements of the configuration of the source data storage system as included in the configuration object database 138 are to be extracted or captured. The libraries 144 may be used by the capture engine 142 in connection with accessing and extracting information from 138 using routines included in 144. The capture engine 142 stores the extracted source data storage system's configuration information in the configuration schema instance 204. In one embodiment, the instance 204 may be in accordance with an XML format and an XML defined schema although an embodiment may use other formats and techniques in connection with describing the extracted source data storage system's configuration information. It should also be noted that although the capture engine 142 may be used in connection with capturing a configuration of a source data storage system, an embodiment may use other techniques in connection with obtaining a configuration schema instance 204 or other entity describing the source configuration information. The capture engine 142 and its inputs and outputs are described in more detail in following paragraphs.

The duplication engine 141's inputs may include a master rule file 210, one or more rule files 212, the configuration schema instance 204, one or more libraries 145, and a target configuration object database 139. The master rule file 210 describes the order in which rules, as described in a rule file included in 212, are processed, the context for the rule, the number of times to execute the rule, and also indicates how the particular rule is implemented. A rule may be implemented or coded, for example, in XML, C, Java, and the like. The master rule file 210 indicates the order in which tags included in the instance 204 are processed. Each tag included in the instance 204 may result in the execution of one or more rules as also specified in the master rule file 210. The rule files 212 may include commands to retrieve (e.g., get) and store or update (e.g., put) configuration information of the target configuration object database 139 as specified in the instance 204. The duplication engine 141 may invoke one or more routines included in a library of 144 in connection with retrieving and/or storing information of component 139. The duplication engine and its inputs and outputs are described in more detail in following paragraphs.

Although use of library routines are illustrated herein, an embodiment may use other techniques in connection with storing and/or retrieving configuration information of the databases 138 and/or 139.

In connection with the source and target data storage systems, an embodiment may operate under certain criteria or assumptions that may vary with embodiment. For example, the criteria may include that the target data storage system include at least those physical components of the source data storage system used in connection with extracted configuration information of the configuration schema instance 204.

Figure 4A:
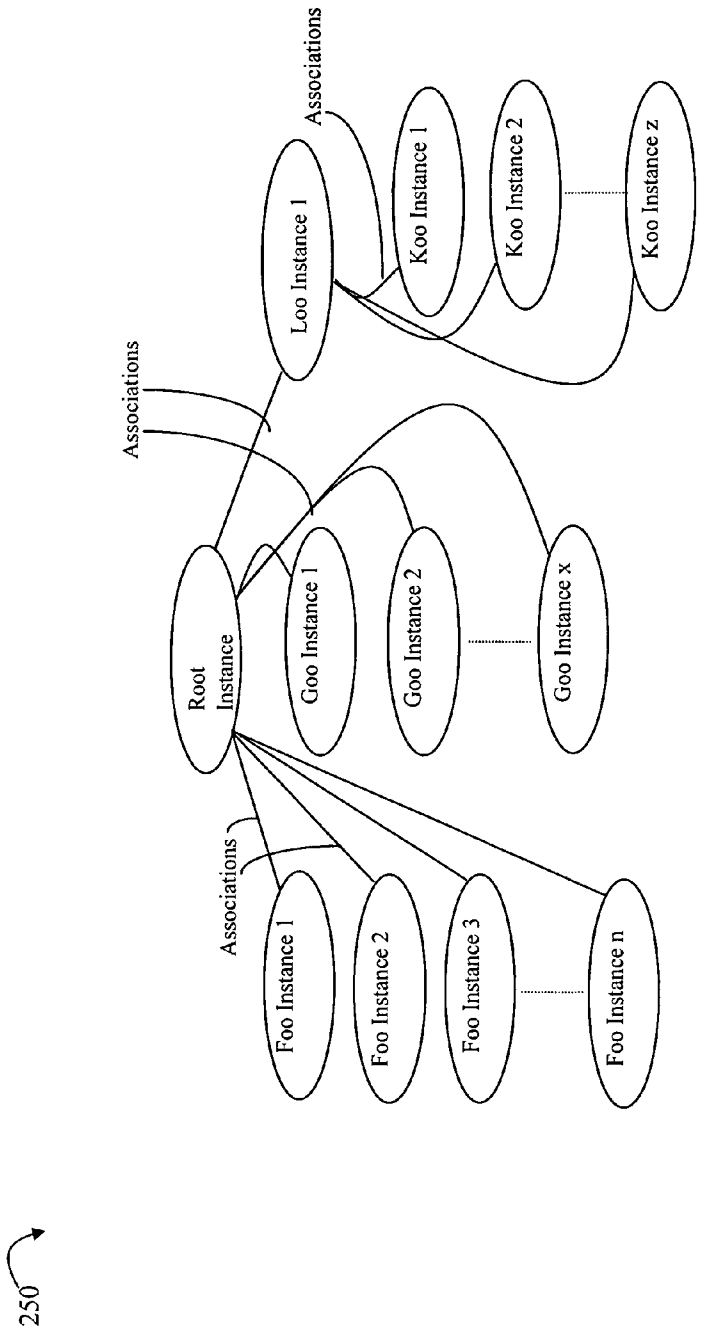
FIG. 4A is an example representation of a data structure that may be used in connection with the techniques described herein.

Referring now to FIG. 4A, shown is an example representation of information included in the configuration object database. The example 250 includes a tree-like structure with nodes representing instances of objects included in the database. The lines connecting nodes identified as associations may also be represented using objects. Each association describes a relationship between two node objects. In connection with capture processing as may be performed by an embodiment of the capture operation, the configuration information may be extracted from one or more instances related to a core instance represented as the root instance in the example 250. Any object in the example 250 may be accessed by traversing a relationship chain originating from the root instance in which the relationships may be expressed using the illustrated associations. For example, each Loo, Goo or Foo instance may be determined directly from the root instance using a single association. Information regarding each Koo instance may be extracted indirectly using the root through Loo instance 1.

The foregoing example 250 illustrates a structure that may be used in representing the configuration information. Additionally, the particular objects represented in the example 250 may be in accordance with a defined categorical hierarchy. In other words, an object may be defined as belonging to one of the categories in the categorical hierarchy.

Figure 4B:
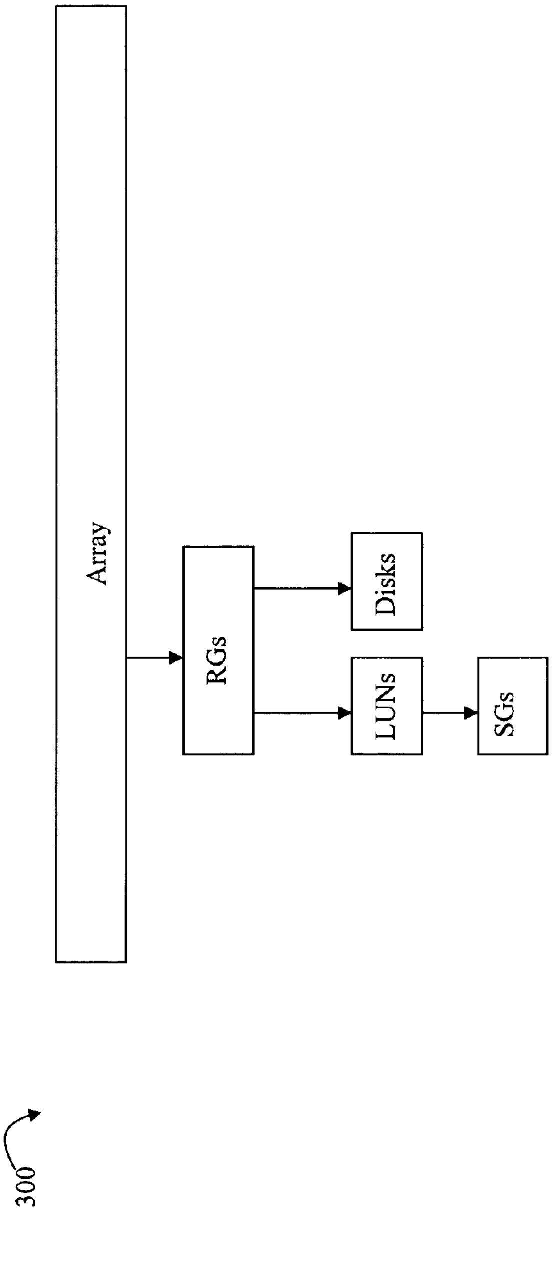
FIG. 4B is an example representation of a hierarchy of categories.

Referring now to FIG. 4B, shown is a representation of one example of a categorical hierarchy that may be used in an embodiment in connection with the techniques described herein. A category may be related to another category. In one embodiment, a category may be characterized as embedded within another category (e.g., a child of another category). A category may also be a peer to another category (e.g., a sibling of another category). The example category tree of 300 includes a root category Array representing the particular data storage system. Array has a single child category, RAID Groups (RGs), identifying the particular RAID groupings. The RGs category has two child categories, LUNs, representing the logically defined device, and Disks, representing physical disk devices. LUNs and Disks are also peer categories with respect to each other, and embedded within RGs. Similarly, storage groups (SGs) is an embedded category of LUNs. As used herein, an SG is a logically defined group of one or more LUNs.

By identifying categories of interest and defining a relationship between categories, it may be specified at a high level how data is to be extracted and how the data may be represented in an output produced by the capture engine. Data included in the layout file 202 and the configuration schema instance file 204 may be in accordance with the defined categories and relationships. Using the techniques herein, the data of 202 and 204 may be defined in a format that reflects the hierarchical relationship between the categories. As an example, data describing a data storage system in accordance with the categorical hierarchy of FIG. 4B may be as follows:

```
ARRAY
  RAIDGROUP 1
    DISK 1
    . . .
    DISK X
    LUN 1
      STORAGEGROUP A
    . . .
    LUN X
      STORAGEGROUP B
  . . .
  RAIDGROUP X
    DISK 1
    . . .
    DISK X
    LUN 1
      STORAGEGROUP C
    . . .
    LUN X
      STORAGEGROUP D
```

Other categorical relationships may be used in connection with the techniques described herein to represent a data storage system. As will be described in more detail herein, also associated with each instance of an object may be one or more properties describing that instance. As an example, a property associated with each instance of a disk may be its location. A property that may be associated with each RAIDGROUP instance may be an identifier, such as a named identifier of the RAIDGROUP.

Based on the foregoing, a layout file 202 may be defined which reflects the hierarchical relationships between the categories. The layout file 202 may also specify which one or more properties of each category instance are of interest. The layout file 202 may also include one or more APIs (application programming interfaces) used in connection with querying the instances of a category in determining the particular properties. As will be illustrated, the layout file may include the parameters for the APIs.

In one embodiment, the layout file 202 and the configuration schema instance 204 may be XML files. To illustrate how the foregoing may be implemented in an embodiment, following is a step-by-step example building of a layout file 202 in accordance with the categorical hierarchy of FIG. 4B.

1. Define the XML file version.
   <?xml version="1.0" ?>
2. Define categories and their relationships to one another. Relationships between categories may be implied by their embedded or peered nature.

```
<?xml version="1.0" ?>
<ARRAY>
  <RAIDGROUP>
    <DISK>
    </DISK>
    <LUN>
      <STORAGEGROUP>
      </STORAGEGROUP>
    </LUN>
  </RAIDGROUP>
</ARRAY>
```

3. Specify the one or more properties of interest for each category

```
<?xml version="1.0" ?>
<ARRAY>
  <RAIDGROUP>
  <RAIDGroupID Class="EV_RAIDGroup" Property=
  "RAIDGroupID"/>
    <DISK>
    <Slot Class="EV_DiskDevice" Property="SuffixAsInteger"/>
    </DISK>
    <LUN>
      <STORAGEGROUP>
      </STORAGEGROUP>
    </LUN>
  </RAIDGROUP>
</ARRAY>
```

In the foregoing, the properties of interest are RAIDGroupID representing the RAID group identifier, and SuffixAsInteger representing the slot location of a physical disk.

4. Designate the association paths that will be used to query for instances that can be used to satisfy the specified category and property requirements

```
<?xml version="1.0" ?>
<ARRAY>
  <RAIDGROUP>
  <Association AssocClass="EV_HasFeature" InputClass=
  "EV_Subsystem"
  ResultClass="EV_RAIDGroupFeature"/>
  <Association AssocClass="EV_HasRAIDGroup"
  InputClass="EV_RAIDGroupFeature" ResultClass=
  "EV_RAIDGroup"/>
  <RAIDGroupID Class="EV_RAIDGroup" Property=
  "RAIDGroupID"/>
    <DISK>
    <Association AssocClass="EV_HasDisk" InputClass=
    "EV_RAIDGroup"
    ResultClass="EV_DiskDevice"/>
    <Slot Class="EV_DiskDevice" Property="SuffixAsInteger"/>
```

-continued

```
    </DISK>
    <LUN>
      <STORAGEGROUP>
      </STORAGEGROUP>
    </LUN>
  </RAIDGROUP>
</ARRAY>
```

In the foregoing, each Association may correspond to a particular API, such as a method call, used to obtain each instance of a particular class and properties of each instance. In other words, the APIs correspond to associations used to traverse the objects in the tree structure as illustrated in FIG. 4A in accordance with the hierarchy of categories of FIG. 4B. The Associations set forth a way in which to query for every instance of a certain category (e.g., the ResultClass) by using an appropriate association class defined by the API (e.g., the AssocClass) and instances of a particular type (e.g., the InputClass). In other words in connection with the foregoing example, for every instance of <InputClass>, use the <AssocClass> association to get all instances of type <ResultClass>.

In connection with each RAIDGROUP instance in this example, the property RAIDGroupID may be extracted using two APIs in accordance with the defined interface provided in this embodiment. The use of two APIs in this case reflects the fact that the published APIs used in one embodiment specifies that one or more APIs may be needed in order to obtain the information desired such as the category instances. Referring back to FIG. 4A, for example, the "root instance" may be EV_Subsystem, meaning this is the base, singular instance needed to perform further queries using the published interface. In connection with one example, instances are of type "EV_RAIDGroup" may be desired (e.g., corresponding to the "Koo" instance types in FIG. 4A) because instances of this type contain the necessary data to describe every defined RAID Group on an array. The API in one embodiment does not have a direct association between EV_Subsystem and EV_RAIDGroup (e.g., more than a singe API call is needed for indirect associations between nodes). Rather, there may be a first association between EV_Subsystem and EV_RAIDGroupFeature, and a second association between EV_RAIDGroupFeature and all EV_RAIDGroups. Thus, in order to obtain all of the EV_RAIDGroup instances, a first API may be invoked to obtain the EV_RAIDGroupFeature instance(s). Using an additional second API with EV_RAIDGroupFeature as the input class, all RAID group instances of type EV_RAIDGroup may be obtained. If the API supported a direct association between EV_Subsystem and RAIDGroups, then a single API may have been used to return all such instances. In other words, the particular APIs used and the number of APIs needed to obtain desired information varies in accordance with the defined hierarchical associations between nodes. Other information included with each association may be parameters used to perform the API.

The associations as included in the foregoing example may be bi-directional in an embodiment with respect to the InputClass and ResultClass meaning that an instance of either class type may be used to retrieve any and all instances of the associated other class type. In one embodiment, each category in the structure of FIG. 4B may be associated with a class. The association may define the link between two instances in which one instance is of the InputClass and the second instance is of the ResultClass. Use of these associations representing an API and parameters are described in following paragraphs in connection with processing the layout file 202 to generate a configuration schema instance.

The layout file may include only associations and property information in accordance with the configuration information that is to be extracted from the source configuration object database. For example, processing the foregoing layout file may result in selectively extracting information about the RAIDGROUPS and Disks. If only information about the Disks is desired, the following layout file may be used omitting the RAIDGROUP property from being extracted. However the associations for the RAIDGROUP are still included to indicate how to traverse between categories of the structure of FIG. 4B to reach the Disks even though no information may be desired regarding the categories of Array, and RGs. In other words, the layout file indicates which APIs are used to traverse the categories of the example 300 to extract the appropriate property information. The layout file may include APIs used to traverse between categories of objects even though no property information is being extracted for those instances

```
<?xml version="1.0" ?>
<ARRAY>
  <RAIDGROUP>
  <Association AssocClass="EV_HasFeature" InputClass=
  "EV_Subsystem"
  ResultClass="EV_RAIDGroupFeature"/.
  <Association AssocClass="EV_HasRAIDGroup"
  InputClass="EV_RAIDGroupFeature" ResultClass=
  "EV_RAIDGroup"/>
    <DISK>
    <Association AssocClass="EV_HasDisk" InputClass=
    "EV_RAIDGroup"
    ResultClass="EV_DiskDevice"/>
    <Slot Class="EV_DiskDevice" Property="SuffixAsInteger"/>
    </DISK>
    <LUN>
      <STORAGEGROUP>
      </STORAGEGROUP>
    </LUN>
  </RAIDGROUP>
</ARRAY>
```

As another variation, if a property about SGs is to be extracted, the layout file may include a first association to traverse between the Array category and the RGs category, a second association to traverse between the RGs category and the LUNs category, and a third association to traverse between the LUNs category and the SGs category. No association is needed regarding RGs and Disks in this example. Additionally, the layout file may indicate which one or more properties of the SGs are to be extracted.

It should be noted that in this particular example layout file, all instances of each category are extracted. An embodiment may also include functionality in the layout file to specify filter criteria indicating which particular instances of specified categories of object are to be described in the configuration schema instance rather than all instances. The filter criteria may specify a particular attribute, value and relationship, for example, so that only those instances meeting the specified criteria are retrieved. As an example, an embodiment may specify filter criteria in the association such as:

<Association AssocClass="EV_HasDisk" InputClass="EV_RAIDGroup" ResultClass="EV_DiskDevice" Filter1="RawCapacity" Value1="50000" Relationship "GE"/> which may result in retrieval of all instances of the specified result class having a RawCapacity greater than or equal to Value1.

What will now be described is processing performed by the capture engine using the layout file in order to generate the configuration schema instance.

Figure 4C:
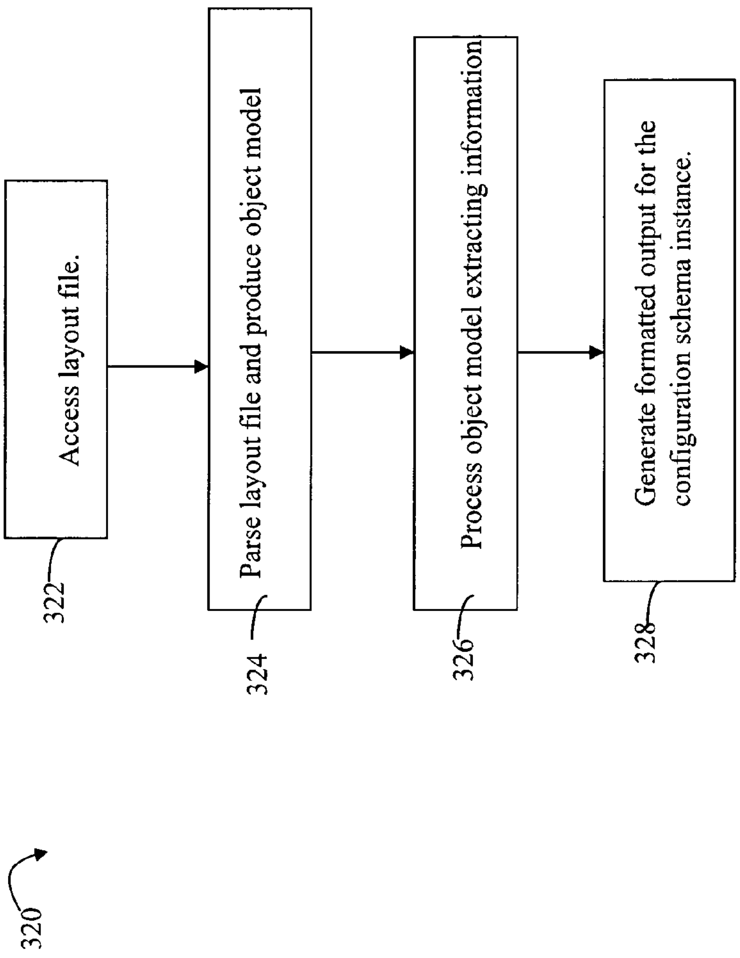
FIGS. 4C, 4D and 4F are flowcharts of processing steps that may be performed in an embodiment in connection with capturing a configuration of a data storage system.

Referring now to FIG. 4C, shown is a flowchart of processing steps that may be included in an embodiment in connection with processing a layout file. The steps of flowchart 320 may be performed by the capture engine described herein. At step 322, the layout file is accessed as an input to the capture engine. The layout file is parsed in step 324 to produce an in-memory object model or representation of the categories, associations, and properties included in the layout file. At step 326, the object model from step 324 is processed to extract configuration information for the particular instances defined in the input configuration object database. At step 328, the formatted output for the configuration schema instance is generated. It should be noted that, as will be described herein in one embodiment, the formatted output of step 328 may be generated as each information is extracted for the instances being processed.

Figure 4D:
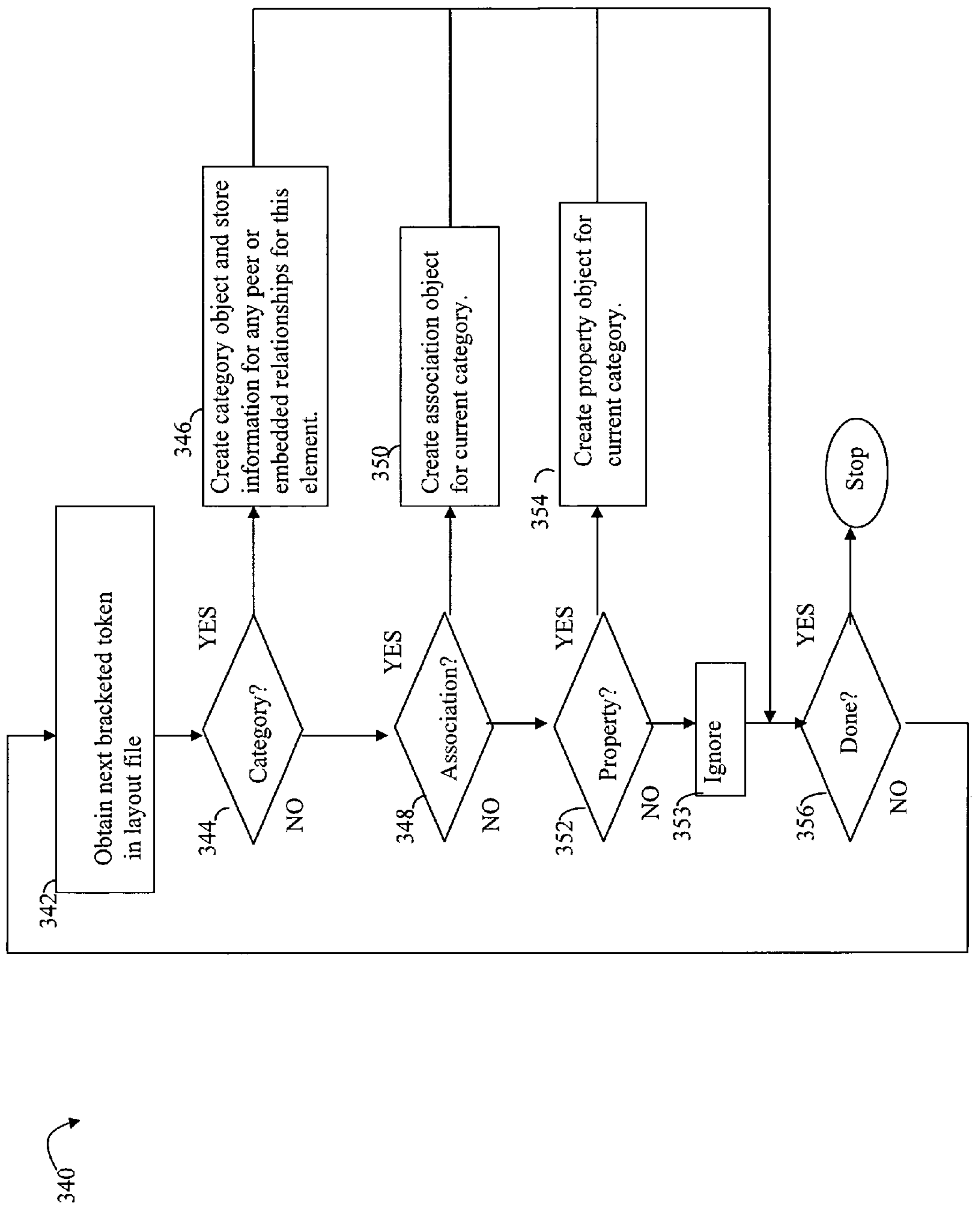

Referring now to FIG. 4D, shown is a flowchart of processing steps that may be performed in connection with parsing the layout file and generating the object model. The flowchart 340 represents more detailed processing that may be performed in an embodiment in connection with step 324 of FIG. 4C. Flowchart 340 describes steps for processing each bracketed item or tag referred to as a bracketed token (e.g., "<item>" such as <ARRAY>) in the layout file. In this example, the layout file is an XML file. As previously illustrated, the layout file may include elements which indicate each category. Each element may be represented between delimiters <xxx> and </xxx> naming as a tag "xxx" a category from FIG. 4. Within each category may be nested another category, or content that is an association or a property. Each defined association and property are associated with the most inner nested category. As mentioned above, an item of content included within each pair of delimiters <> may be a token that is used in connection with flowchart 340 processing. Processing may be performed in flowchart 340 in connection with those tokens indicating a category beginning (e.g., <ARRAY>), an association (e.g., <ASSOCIATION . . . >), or a property (e.g., <NAME Class=" . . . " Property " . . . ">). At step 342, the next token in the layout file is obtained. At step 344, a determination is made as to whether the current token represents a category beginning delimiter, such as for ARRAY, LUNs, RGs, and the like, in accordance with the categories included in FIG. 4B. If step 344 evaluates to yes, control proceeds to step 346 where a category object is created. Additionally, any relationship information regarding the category object may also be specified. For example, if the newly created category object is an embedded object of another, the relationship between the other object and the newly created object may be represented in the object model. Similarly, any peer relationship may also be represented. Such relationships may be represented between objects in a tree-like structure. In one embodiment, category objects may be included in a table in the order in which the categories appear in the layout file. Information regarding embedded and peer relationships may be represented by including an indicator as to the type of relationship, and a pointer or table index of the related category. From step 346, control proceeds to step 356 where a determination is made as to whether processing of the layout file is done. If so, processing stops. Otherwise, control proceeds to step 342 where the next token is obtained and processed.

If step 344 evaluates to no, control proceeds to step 348 where a determination is made as to whether the current token represents an association. If so, control proceeds to step 350 to create an association object for the current category. Control then proceeds to step 356. If step 348 evaluates to no, control proceeds to step 352 where a determination is made as to whether the current element represents a property. If so, control proceeds to step 354 to create a property object for the current category and control proceeds to step 356. If step 352 evaluates to no, the current element is ignored at step 353, and control proceeds to step 356.

In connection with the association objects created by flowchart 340 processing, each category object can contain a list of association objects that designate the association value as defined in the layout file for a particular category. Each category object can contain an associated list of property objects that designate the property values as defined in the layout file is being pertinent to the particular category. Additionally, each property object may include additional information as specified in the layout file and illustrated in connection with examples previously described herein. In one embodiment, each property may include a class/property pair designating how to extract the value for the property. The class may be indicated in the same bracketed token as the property. The class indicated in the property token is also accounted for in one of the associations defined for this category. For example, with reference to the property regarding a disk in:

<Slot Class="EV_DiskDevice" Property="SuffixAsInteger"/> the class EV_DiskDevice is specified in the association

<Association AssocClass="EV_HasDisk" InputClass="EV_RAIDGroup" ResultClass="EV_DiskDevice"/> as a resultclass. In the embodiment described herein, each class indicated with the property (e.g. EV_DiskDevice) is also defined as a result class of a previously specified association as above. In other words, for every EV_DiskDevice instance, a property labeled "Slot" is output having a value derived from the "SuffixAsInteger" property of the EV_DiskDevice instance that is currently being processed.

Figure 4E:
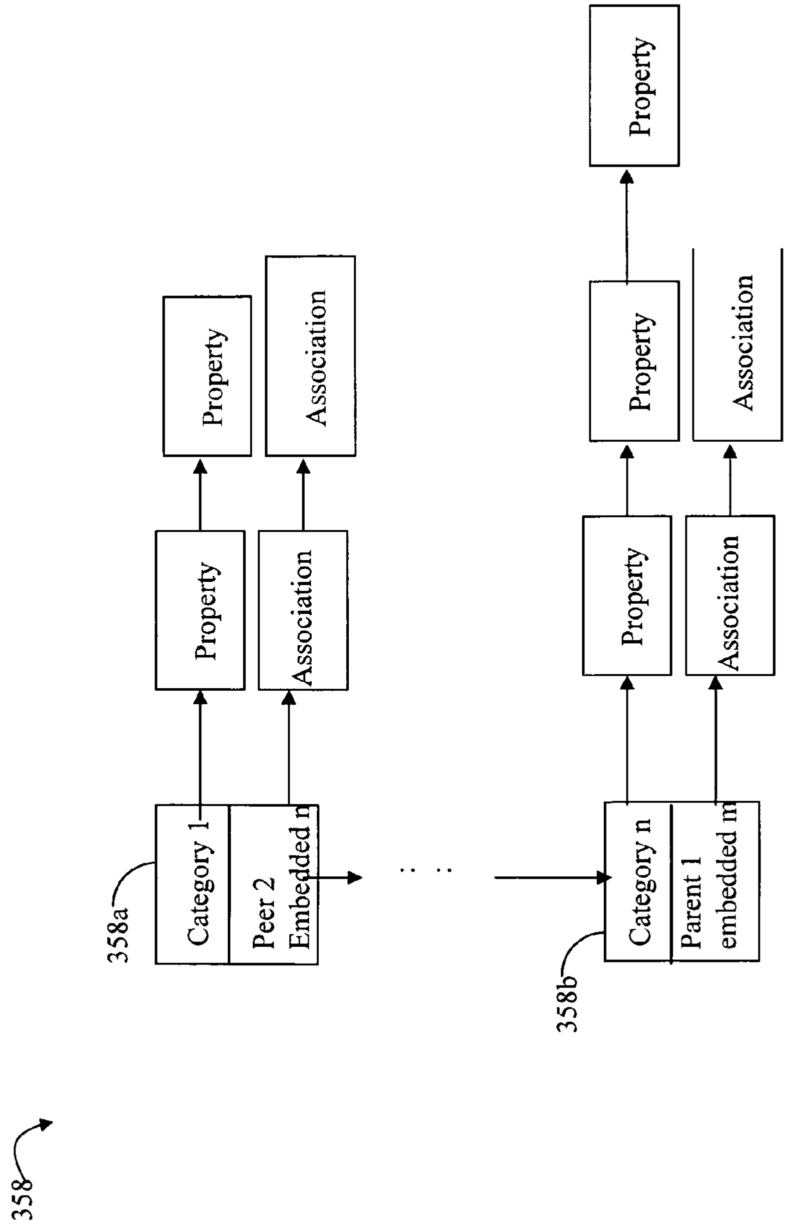
FIG. 4E is an example representation of an object model that may be created as a result of parsing a layout file.

Referring now to FIG. 4E, shown is an example representation of a table that may be created as a result of executing the processing steps of flowchart 340. The example table 358 illustrates lists of properties and associations for categories, such as category 1 and category n. Also included in the example table 358 is information regarding categorical relationships between categories in accordance with the defined hierarchy, for example, as illustrated in FIG. 4B. For example, category 1 as represented by 358*a* has category 2 as a peer category (e.g., as indicated by "Peer 2" in 358*a*). Element 358*a* also has category n as an embedded category (e.g., as indicated by "Embedded n"). Element 358*b* represents category n and has as its parent category 1 represented by node 358*a*. Element 358*b* also has category m as an embedded category (e.g., as indicated by "embedded m"). Other embodiments may use other techniques in connection with indicating relationships between various categories as represented in the particular data structure used for the object model produced as a result parsing the layout file.

It should be noted that information in connection with executing an API for each association may also be included with each association object. Such information may include, for example, one or more parameters as specified in the layout file. Parameters may be indicated, for example, with the enclosed delimiters <> identifying a property within the layout file.

Once the parsing of the layout file is complete, a structured description regarding how the configuration schema instance is to be formatted has been constructed in the form of objects included in a memory object model with relationship data. What will now be described is how the object model produced as a result of parsing may be further processed in order to extract configuration information from the configuration object database describing the source data storage system. Once the information has been extracted, it may then be formatted in a manner similar to as described in connection with the layout file. In one embodiment, the configuration schema instance may be an XML file following the same general structure as described elsewhere herein for the layout file. An example of a configuration schema instance file is described in more detail herein.

Figure 4F:
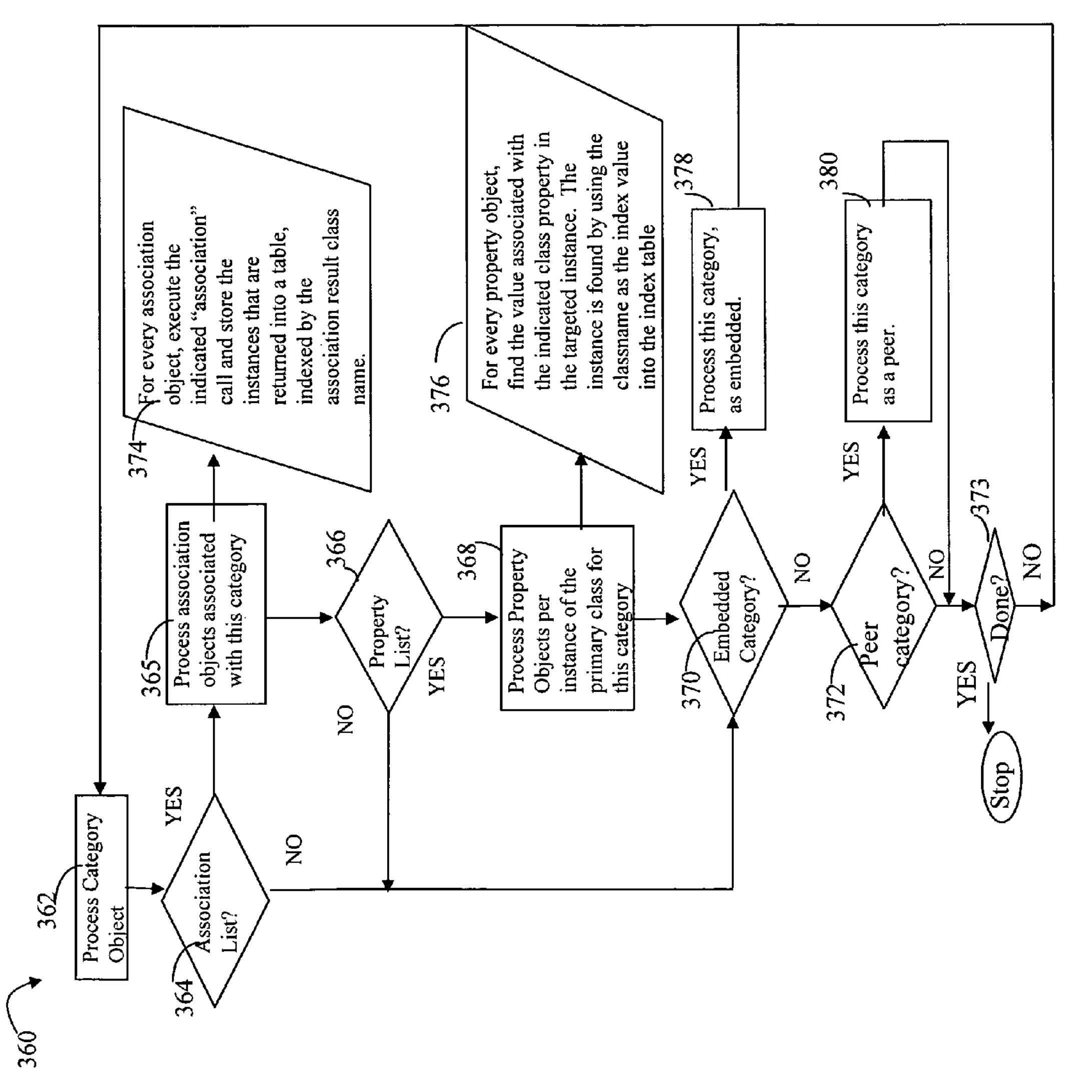

Referring now to FIG. 4F, shown is a flowchart 360 of processing steps that may be performed in an embodiment in connection with processing the object model produced as a result of parsing the layout file. The processing steps of flowchart 360 may be performed by the capture engine and provide additional detail for step 326 of flowchart 320 previously described herein. The processing steps of flowchart 360 may be performed for each category object.

At step 362, the current category object is obtained for processing. In one embodiment, the category objects may be obtained from the table as illustrated in 358. At step 364, a determination is made as to whether an association list exists for the current category object. If so control proceeds to step 365 to process each of the association objects associated with the current category. As part of step 365 processing, the list of association objects for the current category object is traversed. For every association object, the indicated association call, such as an API, is executed. In connection with the embodiment described herein, execution of an association call may return all of the instances of the particular result class. For example, execution of the API for the following association:

<Association AssocClass="EV_HasDisk" InputClass="EV_RAIDGroup" ResultClass="EV_DiskDevice"/> returns every instance of a disk for a current RAID group. In one embodiment, the capture engine subsequently processes each instance of EV_RAIDGroup as returned from the above association. The capture engine in this embodiment caches all retrieved EV_RAIDGroup instances and processes them one at a time. As another example, one or more associations may be specified in connection with obtaining RG instances, LUN instances, and the like. Invocation of the specified API as indicated by the association may result in return of all instances defined in a configuration object database of the source data storage system. In one embodiment, the APIs for the association objects perform data retrieval operations (e.g., "gets") for the configuration object database of the source data storage system. Each instance returned as a result of invoking a specified API may be stored in another table or other data structure indexed by the association's result class name.

Control proceeds to step 366, where a determination is made as to whether a property list is defined for the current category. If so, control proceeds to step 368 to process the property objects associated with the current category. For every property object, the value associated with the indicated class property is located in the targeted instances. The targeted instances may be found by using the class name associated with the property object as an index value into the indexed table populated at step 374. For example, execution of the API for the following association:

<Association AssocClass="EV_HasDisk" InputClass="EV_RAIDGroup" ResultClass="EV_DiskDevice"/> results in a return of one or more instances of disks for the particular RAID group instance currently being processed. Each instance of a disk may be associated with the association result class EV_DiskDevice in accordance with previous processing for step 374. When a property object referencing a property for instances of the result class EV_DiskDevice is encountered as represented by:

<Slot Class="EV_DiskDevice" Property="SuffixAsInteger"/> the indicated class for the property (e.g., EV_DiskDevice) may be used an index to retrieve all instances associated with the indicated class as previously stored in connection with step 374 processing. The property SuffixAsInteger may be retrieved for each instance. Control then proceeds to step 378 where a determination is made as to whether the current category is an embedded category. If so, control proceed step 378 to process this category as a child category of the parent as may be indicated in the object model. Information regarding the particular parent-child relationship may be used in connection with formatting the output of the configuration schema instance. Control then proceeds to step 362 to process the next category object.

If step 370 evaluates to no, control proceeds to step 372 where a determination is made as to whether the current category is a peer category. If step 372 evaluates to yes, control proceeds to step 380 to process the current category as a peer category. Information regarding the parent category of the current category may be used in connection with producing the formatted output of the configuration schema instance. Control proceeds from step 380 to step 373 where a determination is made as to whether all category objects have been processed. If so, processing stops. Otherwise, control proceeds to step 362 to process the next category. If step 372 evaluates to no, control proceeds to step 373.

If step 364 evaluates to no, control proceeds to step 370 processing. If step 366 evaluates to no, control also proceeds directly to step 370 processing.

In one embodiment, formatted output included in the configuration schema instance may be produced as values are extracted from instances being processed in connection with the steps of flowchart 360. As described previously in connection with a layout file, the category information included in the layout file is in accordance with a defined hierarchy of categories. An embodiment may also generate the formatted output at the end of processing the entire object model or at other points in processing of the object model. The particular hierarchy of categories and their arrangement as indicated in the layout file may be reflected in the configuration schema instance file with particular parent-child and sibling relationships being maintained between instances of categories.

Figure 5:
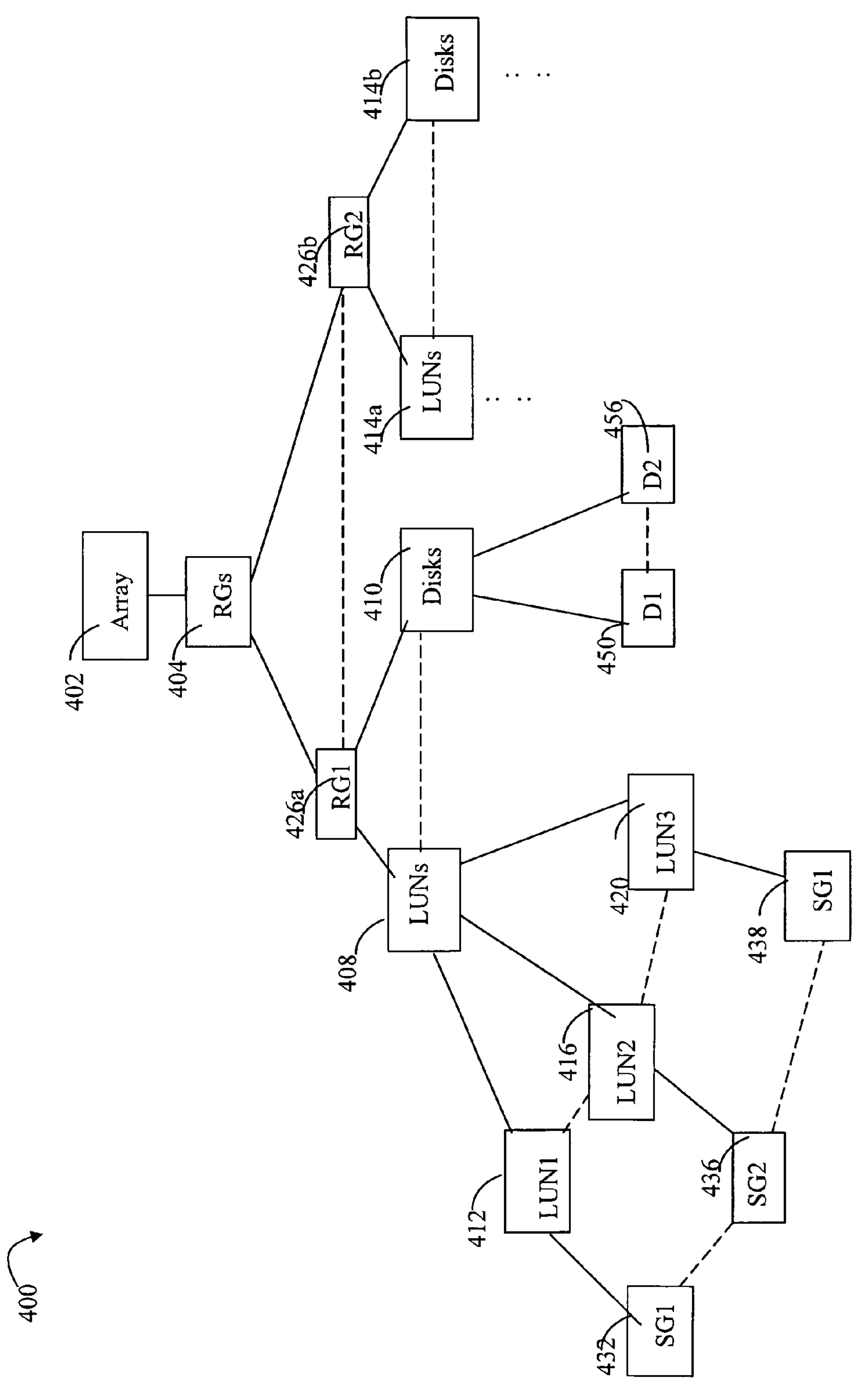
FIGS. 5-6 are other example representations of a data structure that may be used in connection with the techniques described herein.
Figure 6:
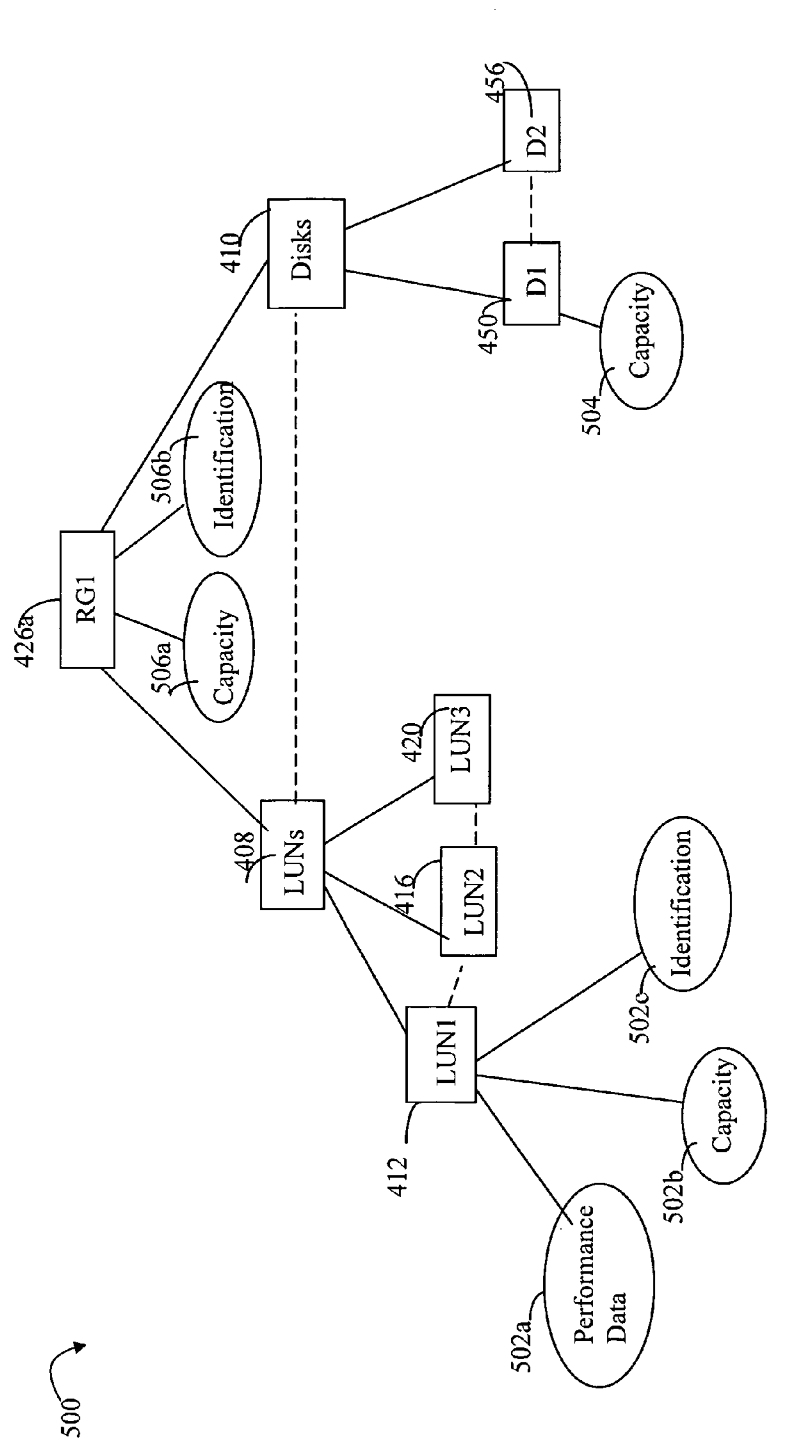

Referring now to FIGS. 5 and 6, shown is an example representation of information that may be extracted from a configuration object database. The represention of FIGS. 5 and 6 may be generated as a result of parsing a layout file, generating an object model (e.g., by performing processing steps of flowchart 340), and subsequently processing the object model (e.g., by performing processing steps of flowchart 360). The configuration information included in the representation 400 reflects the hierarchical categorical structure as may be described in the layout file for the particular instances retrieved from the configuration object database of a source data storage system. Additionally, the representation may include extracted property information in accordance with the layout file.

In the example 400 of FIG. 5, array is defined as the root of the tree structure 402. The RGs category as represented by 404 may be characterized as a data container for one or more instances of the RGs. Embedded relationships are represented in the example 400 using solid lines drawn between nodes of the structure. Peer relationships are represented using dashed lines between nodes of the structure. In this example, two RG instances are defined as represented by nodes 426*a* and 426*b*. RG1 426 has 3 LUN instances as represented by 412, 416 and 420, and two disk instances as represented by 450 and 456. LUN1 412 belongs to SG1 432. LUN2 416 belongs to SG2 436. LUN3 belongs to SG1 438. The particular LUN instances as represented by 412, 416 and 420 may be returned as a result of executing one or more APIs specified for an association included in the layout file to return the LUNs defined for a particular RAID group. As described elsewhere herein, the particular APIs and number of APIs invoked to retrieve desired information may vary with each embodiment. For example, one embodiment may return all LUN instances as a result of invoking a single API indicated with the RAIDGroupHasLUNs association using an input class defined for RAIDGroup. Another embodiment may define a published interface of APIs in which a first API may be executed to obtain the class instance represented by 408 and a second API to obtain the LUN instances represented by 412, 416 and 420. Similarly, the physical disks are represented by instances 450 and 456 which may be returned as a result of executing one or more APIs specified for an association included in the layout file to return the disks defined for a particular RAID group.

It should be noted that additional details regarding RG2 have been omitted from this particular example for purposes of simplicity and illustration. The foregoing is illustrative and may represent a portion of configuration information that may be included in a configuration object database. It should also be noted that an embodiment may use a variation of the conventions and techniques described herein to store and represent the configuration information extracted.

Referring now to FIG. 6, shown is an example 500 illustrating configuration information in more detail that may be specified regarding RG1 426. The configuration information of FIG. 6 may be included in the same structure of the example 400 for the appropriate nodes but has been included in 500 for clarity in illustration.

Associated with LUN1 412 is configuration information represented by 502*a*, 502*b*, 502*c* and 502*d*. Associated with RG1 426 is configuration information represented by 506*a* and 506*b*. Associated with D1 450 is configuration information represented by 504. It should be noted that information included in nodes 506*a*, 506*b*, 504, 502*a*, 502*b* and 502*c* may be determined using the property object in accordance with a property specified in the layout file.

In connection with LUN1 412, performance data 502*a* may include performance information about LUN1 such as, for example, the number of blocks read and/or written, the number of read and/or write requests, and the like. Capacity 502*b* may include, for example, the amount of physical storage associated with LUN 1, the amount of storage used, and the like. Identification 502*c* may include identification information for this particular LUN, such as the LUN number. In connection with RG1 426*a*, capacity as represented by 506*a* may specify, for example, an amount of physical storage available for the raid group, the amount actually used, and the like. The identification as represented by 506*b* may include an identifier for the particular RAID group represented by 426*a*. The capacity as represented by 504 may specify, for example, the amount of physical storage of the physical disk represented by 450 D1.

An embodiment may include other property information for each of LUNs 416 and 420 and the disk D2 represented by

456 although such detail has been omitted for purposes of illustration. Following is a representation of information that may be included in a layout file to obtain the information as represented in FIGS. 5 and 6.

```
<?xml version="1.0" ?>
<ARRAY>
  <RAIDGROUP>
  <association to get each raidgroup instance>
  <property for CAPACITY>
  <property for IDENTIFICATION>
    <DISK>
    <association to get each disk instance per RAIDGROUP instance>
    <property for CAPACITY>
    </DISK>
    <LUN>
    <association to get each LUN instance per RAIDGROUP instance>
    <property for PERFORMANCE DATA>
    <property for CAPACITY>
    <property for IDENTIFICATION>
      <STORAGEGROUP>
        <association to get each SG instance per LUN instance>
      </STORAGEGROUP>
    </LUN>
  </RAIDGROUP>
</ARRAY>
```

Following is a general format of the structured output of the configuration schema instance output for the foregoing layout file as represented in FIGS. 5 and 6:

```
<ARRAY>
  <RAIDGROUP 1> CAPACITY, IDENTIFICATION
    <LUN1>
    LUN1 - PERFORMANCE DATA, CAPACITY, IDENTIFICATION
    </LUN1>
      <STORAGE GROUP 1>
       STORAGE GROUP 1
      </STORAGE GROUP 1>
    <LUN2>
    LUN2 --PERFORMANCE DATA, CAPACITY, IDENTIFICATION
    </LUN2>
      <STORAGE GROUP 2>
       STORAGE GROUP 2
      </STORAGE GROUP 2>
    <LUN3>
    LUN3-- PERFORMANCE DATA, CAPACITY, IDENTIFICATION
      <STORAGE GROUP 1>
       STORAGE GROUP 1
      </STORAGE GROUP 1>
    <LUN3>
    <DISK1>
    DISK 1-- CAPACITY
    </DISK1>
    <DISK2>
    DISK 2-CAPACITY
    </DISK2>
  </RAIDGROUP 1>
  <RAIDGROUP 2> CAPACITY, IDENTIFICATION
    <LUN1>
    LUN 1 --PERFORMANCE DATA, CAPACITY, IDENTIFICATION
      STORAGEGROUP C
    </LUN1>
    .....
    <LUNX>
    LUN X-- PERFORMANCE DATA, CAPACITY, IDENTIFICATION
      STORAGEGROUP D
    </LUNX>
    <DISK1>
    DISK 1-- CAPACITY
    </DISK1>
    .....
    <DISKX>
    DISK X-- CAPACITY
    </DISKX>
```

-continued

```
  </RAIDGROUP 2>
</ARRAY>
```

As described herein, the layout file may define a template of information to be extracted for each instance of a defined category. The particular configuration information for each instance may be included in the configuration schema instance. Although the particular examples illustrated herein include only a small number of LUNs, etc. for purposes of illustration, an actual data storage system configuration may include hundreds or thousands of LUNs and associated information. Similarly, a data storage system may include hundreds of physical disks. As such, one skilled in the art will appreciate that the benefit of using the techniques described herein increases with the complexity of a data storage system configuration.

It should be noted that although the layout file and configuration schema instance file are XML files, other file formats may be utilized. For example, an embodiment may utilize the techniques described herein in connection with CSV (Comma Separated Value) format files.

As just described, capture processing as may be performed by the capture engine may be used in connection with extracting data from a configuration object database that includes an instance hierarchy. The particular information to be extracted may be specified in the layout file. For example, the layout file may indicate that only a portion of configuration information for data storage system should be extracted from the configuration object database describing the data storage system's configuration. The extracted configuration information may be stored in the form of a formatted output, such as the configuration scheme instance.

What will now be described is duplication processing as may be performed by the duplication engine previously described in connection with FIG. 3. The duplication engine may be used in connection with processing the configuration schema instance produced as a result of capture processing by the capture engine just described. It should also be noted that the duplication engine may utilize a configuration schema instance produced using other techniques including, for example, manual generation.

In one embodiment, the configuration schema instance may be copied to a target data storage system. The configuration information included in the configuration schema instance may be used in connection with replicating the data storage configuration of a source data storage system on the target data storage system. Any one of a variety of different techniques may be used in connection with making the configuration schema instance available for use on the target system in connection with duplication processing. For example, the configuration schema instance may be pushed from the source data storage system to the target data storage system. An embodiment may also pull the configuration schema instance from the source data storage system to the target data storage system such as by controlling duplication processing from the target data storage system. An embodiment may also control duplication processing from another location other than the source and target data storage systems. It should be noted that capture processing described herein may also be controlled from a location other than the source data storage system such as, for example, using APIs to control the capture engine. Similarly, the duplication engine may be controlled from the source data storage system, target data storage system, or other location using APIs.

Figure 7:
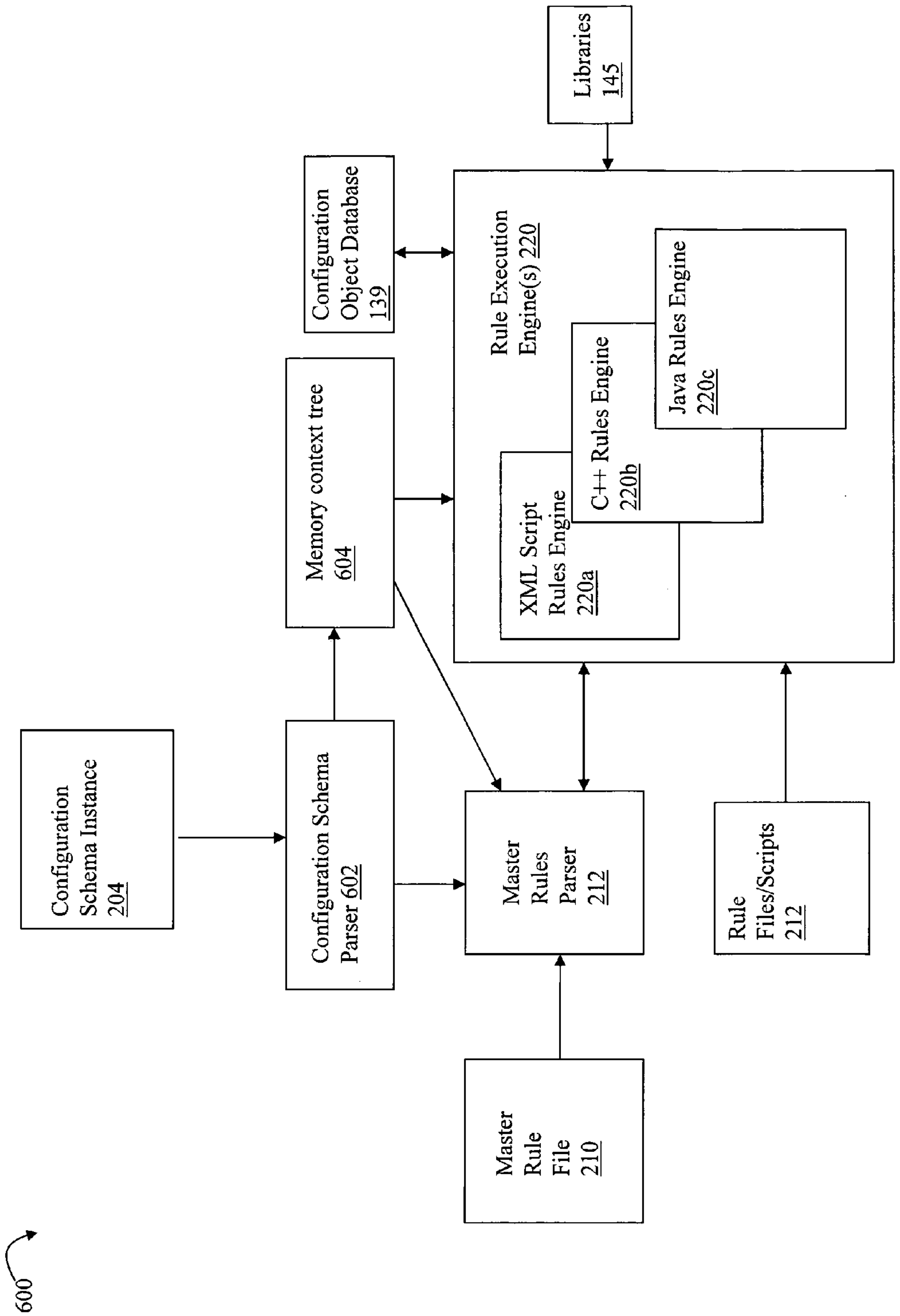
FIG. 7 is an example representation of components that may be included in an embodiment and used in connection with duplicating a captured configuration of a data storage system.

Referring now to FIG. 7, shown is an example 600 of components that may be included in an embodiment of the duplication engine in connection with performing duplication processing. As described herein, duplication processing may be performed on the target data storage system. In the example 600, the configuration schema instance 204 may be parsed by a configuration schema parser 602. The configuration schema instance 204 represents the data storage system configuration information that is to be duplicated. The configuration schema instance parser 602 may create a memory context tree 604 representing the information input from the configuration schema instance 204. In one embodiment, the memory context tree 604 may be represented and include information similar to as described and illustrated in connection with FIGS. 5 and 6. The memory context tree 604 may be stored in memory used during execution of the duplication engine. Once the parsing of the instance 204 is complete, control is passed to the master rules parser 212. The master rules parser 212 parses the master rule file 210 and generally drives the operation of the duplication processing from this point in duplication processing. The master rule file 210 identifies an order in which elements included in the configuration schema instance 204 are processed. In one embodiment, the master rule file 210 may be an XML file. An object tag (e.g., <OBJECT>) may be used for specifying an XML element tag of the configuration schema instance 204 to be processed. During execution, the master rules parser 212 reads a next object tag indicating the next XML element of the configuration schema instance 204 to be processed. The master rules parser 212 determines if any such elements are included in the memory context tree 604. If not, the master rules parser 212 proceeds to extract the next object tag from the master rule file 210. If the memory context tree 604 includes an XML element corresponding to the current object tag, the master rules parser 212 determines if the master rule file 210 specifies any rules to be executed for each instance of the XML element and executes the specified rule(s).

An embodiment of the master rules parser 212 may parse the master rules file searching for the next rule. Once the next rule is located, context information for the context of the current rule may be determined. Such context information may include hierarchical information regarding the location of the rule with respect to object tags (e.g.OBJECTs in the master rule file as described above) corresponding to XML elements in the configuration schema instance file. Context information may also include data for the particular values or instances of tag elements. The master rules parser 212 may use this context information when determining whether there is a match in the configuration schema instance 602 for the current rule. The current context information may also be represented in the memory context tree 604 by the particular location in the tree structure of the XML element of the instance 602 determined as a matching context. In other words, the parser 212 may determine whether there is a matching context in the memory context tree 604 in accordance with the context of the current rule using hierarchical information of the tree 604. Once the master rules parser 212 has finished executing a rule, the parser 212 proceeds to the next rule. Each rule by its location in the master rule file 210 has an associated implicit context for the execution of the rule. The master rules parser 212 sets the appropriate context in accordance with the execution of each rule. As also described herein in more detail, a matching context for a current rule may be determined in accordance with the context of an element in the configuration schema instance.

In connection with the execution of a rule, the parser 212 invokes the rules execution engine 220 to execute the rule. In one embodiment, the rule execution engine 220 may include one or more different rule execution engines capable of executing rules in a variety of different input forms or types. In one embodiment, rules implemented using an XML script, C++, and Java may be supported. A different rules engine, such as 220*a*-220*c*, may be included for each supported rule type. The appropriate rules engine is invoked in accordance with the particular type of the rule. In one embodiment, each rule may have a corresponding rule file or script included in 212. The name of the rule file or script as well as the particular type may be indicated in the master rule file 210 and passed to the rule execution engine 220 which then selects an appropriate rule execution engine from 220*a*-220*c* to execute the rule. Each rule file of 212 may result in performing one or more put or set operations to update the configuration object database 139 in accordance with the configuration information as represented in the memory context tree 604. Routines or methods may be invoked as included in one or more libraries of 145 in connection with performing operations on the database 139. A rule file 212 may also result in performing one or more retrieval operations to obtain information from one or more of: the memory context tree 604, the environment, and the configuration object database 139. As will be described in more detail herein, an environment may be associated with execution of a rule using environment blocks. Various items may be defined in the environment and used during execution of a rule. The environment may be characterized as a scratch pad memory area into which script statements may store information temporarily for reference by subsequent script statements. As will be described herein, the information stored in the environment area may be retrieved from the memory context tree or from the target data storage system's object database (e.g., configuration object database 139). As used herein, a current context in connection with duplication processing may refer to that portion of the memory context tree 604 for the XML element of the configuration schema instance 204 currently being processed. In the event it is determined that there is a matching context between a current rule of the master rule file 210 and the tree 604, the same context may be represented in both the tree 604 (e.g., using the hierarchical tree structure) and the master rule file 210 (e.g., as reflected using the structured XML tags and format).

The foregoing process of the master rules parser 212 performing processing for each rule from the master rule file 210 having a matching context as represented in the memory context tree continues until the entire master rule file 210 has been read by the parser 212. Upon completion, the configuration object database 139 reflects the updating steps as may be performed by the rule execution engine 220 in accordance with the configuration schema instance 204.

What will now be described is an example of what may be included in a master rule file 210 of an embodiment. In one embodiment the master rule file 210 may be an XML based file including object tags for specifying corresponding XML element tags from the configuration schema instance 204 to be processed. Consider the following example snippet as may be included in a master rules file 210:

```
<OBJECT NAME="LOGICALs">
    <OBJECT NAME="RAIDGROUPs">
        <OBJECT NAME="RAIDGROUP">
            <HANDLER NAME="CreateRAIDGroup.xml" TYPE=
            "SCRIPT"/>
            <HANDLER NAME="PollSubsystem.xml" TYPE="SCRIPT"
                EXECUTIONOPTION="EXECUTEONCE"/>
```

-continued

```
    </OBJECT>
  </OBJECT>
</OBJECT>
```

In the foregoing the handler tag indicates a particular rule to be executed. The type indicates the type of the rule and rules engine to be invoked. In one embodiment, the type may be one of: script (indicating the rule is an XML script), class (indicating the rule is implemented using C++, or Java (indicating that the rule is implemented using Java). Also in the foregoing, the handler tag identifies a rule which, by default, is executed for each instance of a corresponding XML tag. In one embodiment, an option may be supported to allow for altering the foregoing default execution. Use of the EXECUTIONOPTION=EXECUTEONCE may identify a particular rule which is to be executed only once for the first instance of a corresponding XML tag. When the foregoing is read by the master rules parser 212, the parser 212 looks for all RAID group tags included in 204 (e.g., as represented in the memory context tree 604) under the LOGICALS\RAIDGROUPS tag and executes the Create RAID Group.xml script with the RAIDGROUP tag as the current context. This script will be executed for every instance of a RAID group included in the memory context tree 604. After execution of the foregoing Create RAIDGroup for each instance, PollSubsystem.xml is executed once.

Within the master rule file 210, object tags and associated rules to be executed may be specified in an order dependent on particular operations to be performed as part of duplication processing. For example, as illustrated elsewhere herein, an SG may be defined which includes one or more LUNs. Prior to performing operations to add one or more LUNs to an SG, the SG is created and then each LUN is identified as belonging to the SG. The particular dependency or ordering is specified in the master rule file 210. The content and ordering of items included in the master rule file 210 may vary in accordance with embodiment.

What will now be described in more detail is the rule files/scripts 212. In one embodiment, each of the rule files 212 may be defined as an XML file. For example, an XML file for a rule may include an XML script as may be executed by the XML script rules engine 220*a*.

A rule file may have a general format including zero or more environment blocks and an zero or more execution blocks. In one embodiment, an environment block may be marked by tags <ENVIRONMENT> . . . </ENVIRONMENT>, and an execution block may be marked by tags <EXECUTE> . . . </EXECUTE>. An environment block may be used in connection with getting or defining objects as may be referenced later in the script. For example, objects may be defined in the environment block by retrieving information from the configuration object database 139 and/or the memory context tree. Such objects defined in the environment may be later referenced in connection with storing information in the configuration object database 139. The environment block may be used in connection with getting configuration information needed to execute the operation specified in a subsequent execution block. The execution blocks may be characterized as put operations which store information in the configuration object database 139. As described above, information for a current context may be retrieved from the memory context tree 604 and used in connection with the environment and/or execution blocks.

In one embodiment, different language elements may be defined for use in the environment and execution blocks. Following is an example grammar that may be used in connection with defining XML based rules. In the following, the notation "→" sign is read as "can have" or may include. The rules below may also be referred to as production rules. An element on the left hand side may map to a bolded version of itself on the right side of a grammar rule. The right side bolded version is a terminal element with all others being non-terminal elements.

<table>
<tr><td><SCRIPT></td><td>→</td><td><ENVIRONMENT>* | <EXECUTE>*</td></tr>
<tr><td><ENVIRONMENT></td><td>→</td><td><IMETHODCALL>|<METHODCALL> |<FILTER>* | <SCRIPT> | <CONSTRAINT></td></tr>
<tr><td><EXECUTE></td><td>→</td><td><METHODCALL> |<CONDITION>|<SCRIPT>| <STOP> | <RUNAGAIN></td></tr>
<tr><td><IMETHODCALL></td><td>→</td><td><PARAMREF>* | <PARAMVALUE>*|<INSTANCENAMEREF></td></tr>
<tr><td><METHODCALL></td><td>→</td><td><PARAMREF>*|<PARAMVALUE>*|<INSTANCENAMEREF></td></tr>
<tr><td><INSTANCENAMEREF></td><td>→</td><td><ENVREF></td></tr>
<tr><td><FILTER></td><td>→</td><td><OPERATOR>*</td></tr>
<tr><td><COND></td><td>→</td><td><OPERATOR> | < ONTRUE >|< ONFALSE ></td></tr>
<tr><td><ONTRUE></td><td>→</td><td><EXECUTE></td></tr>
<tr><td><ONFALSE></td><td>→</td><td><EXECUTE></td></tr>
<tr><td><OPERATOR></td><td>→</td><td><OPERATOR>*|< PROPERTYREF >* | <VALUE> | < ERRORTAG></td></tr>
<tr><td><PARAMREF></td><td>→</td><td><CONTEXTREF>|< ENVREF></td></tr>
<tr><td><PARAMVALUE></td><td>→</td><td><VALUEARRAY>|< VALUE></td></tr>
<tr><td><PROPERTYREF></td><td>→</td><td><CONTEXTREF>| < ENVREF></td></tr>
<tr><td><VALUEARRAY></td><td>→</td><td><VALUE>*</td></tr>
<tr><td><CONTEXTREF></td><td>→</td><td><CONTEXTREF> | <CONTEXTREF></td></tr>
<tr><td><ENVREF ></td><td>→</td><td><ENVREF></td></tr>
<tr><td><VALUE></td><td>→</td><td><VALUE></td></tr>
<tr><td><STOP></td><td>→</td><td><STOP></td></tr>
<tr><td><RUNAGAIN></td><td>→</td><td><RUNAGAIN></td></tr>
<tr><td><CONSTRAINT></td><td>→</td><td><CONSTRAINT></td></tr>
</table>

Each of the foregoing non-terminals correspond to XML tags that may be included in a rule file. The foregoing tags are now described in more detail as may be included in an embodiment.

<SCRIPT>: The script tag represents a script. A script can set up one or more environments, using the ENVIRONMENT tag, for its execution, and one or more set or put operations to the database 139 as may be specified using the EXECUTION tag.

<ENVIRONMENT>: An Environment tag may be used for setting up objects in the environment. The objects may be used subsequently referenced later in the script. A method call may be specified using an environment tag. In one embodiment, one or more methods may be defined which return all instances of a specified class. The specified class may be associated with each category of the hierarchy of categories as described elsewhere herein such as in connection with FIG. 4B. One or more methods may also be defined to return a single object or multiple objects to the environment. Objects returned to the environment can be named explicitly. If no explicit name is defined, the objects may be implicitly named such as may be referenced using the object class name. In one embodiment, the ENVIRONMENT production rule may be used to define an ENVIRONMENT script element which performs a method call, defines a filter, or invokes a script. As described herein, a METHODCALL and an IMETHODCALL may correspond to different method calls in accordance with different specific provider interfaces.

<EXECUTE>: An Execute tag may be used for set operations to the database 139 performed by the script. In one embodiment, the Execute tag may be used to specify a method call to perform the put operation.

<IMETHODCALL>: These tags may refer to method calls by a specific provider or interface.

<METHODCALL>: These tags may refer to method calls by a specific provider or interface.

<FILTER>: These tags may be used for filtering the objects retuned to the environment. The object(s) selected as a result of the filtering operation may be referenced by a different name. The Filter has one operator as may be specified using the OPERATOR tag for operating on the environment data.

<OPERATOR>: Specifies a supported operator. In one embodiment, operators can use OPERATOR recursively. Operators supported in one embodiment are "EQUALS", "AND", "OR".

<COND>: A condition tag has an operator tag to be evaluated. This tag may have an associated "true" handler (e.g., TRUEHANDLER tag) and a "false" handler (e.g., FALSEHANDLER tag) to perform processing depending on the return value of the operator.

<TRUEHANDLER>: This tag is represents the block to be executed if the condition evaluates to true (non-zero).

<FALSEEHANDLER>: This tag is represents the block to be executed if the condition evaluates to false (zero).

<INSTANCENAMEREF>: This tag represents the name of a class, the instance name of whose instances are determined from the environment. Execution of this tag can produce one or more instance names.

<PARAMREF>: The tag represents a parameter as may be used to specify a method parameter. This tag indicates that the parameter is a reference parameter and is determined either from the memory context tree or from the environment.

<PROPERTYREF>: This tag is used for specifying a property. This tag specifies that the property is a reference property indicating that the property is determined by those included in the memory context tree or the environment.

<ENVREF>: This tag indicates that the specified property or class is determined by looking at defined properties and classes for the environment.

<CONTEXTREF>: This tag means that the property or class is determined using the memory context tree. The CONTEXTREF can in turn lookup a context return value by utilizing another CONTEXTREF unless CONTEXTREF returns a property.

<PARAMVALUE>: This tag represents a parameter as may be used with a method call and indicates that the parameter is a value. The value in this embodiment may be hardcoded or included in the script.

<VALUEARRAY>: This tag represents an array of values.

<VALUE>: This tag represents a hard-coded value.

<CONSTRAINT>: This tag may be used to ensure certain constraints are valid before the execution of scripts. As an example, the CONSTRAINT tag may be used to determine certain execution preconditions such as, ensuring an object used by the script is available in the environment, ensuring the context memory tree has certain embedded objects before beginning execution of a script, and the like.

<STOP>: This allows the script to tell the runtime engine to stop its execution of the current context. The runtime engine will proceed to the next context.

<RUNAGAIN>: This allows the script to inform the rules engine to execute the script again for the same current context. This tag may be used, for example, when a script determines that the objects that will be used are in a transition state. Existence of a transition state may be determined in accordance with statements of the script as executed. The script may retrieve an object from the target configuration object database 139 and inspect a property, for example, which may not have an expected value providing an indication that the associated object is in a state of transition. Accordingly, if such a state is detected, the RUNAGAIN statement may be used in the script to cause the runtime engine to execute the script again for the same context. In one embodiment, the rules engine may wait for a predefined amount of time and run the same script under the same context again. As an example in connection with a data storage system, many operations may be dependent on LUNs such as operations performed to add one or more LUNS to a storage group (SG). A LUN which is "in transition", such as in the process of being defined, may be determined using the is Transitioning property associated with each LUN instance. Other embodiments may use other techniques in connection with defining and determining such a state of transition associated with an object, It should be noted that scripts may be nested or invoked from one another to allow for code reuse. For example, a script may define one or more environment blocks that are commonly referenced by one or more other scripts. One particular use of this may be in defining an environment to get certain information from the database 139 and define one or more instances for use in the environment. For example, a get operation may be defined to obtain objects for one or more physical components of the database 139.

What will now be described is a portion of what may be included in an XML rule file to illustrate various aspects of the foregoing language elements. In the example snippet below, one or more LUNs are being added to a storage group. In connection with the example below, it is assumed that defined in the environment are the storage groups (SGs) and LUNs for the data storage system. In other words, appropriate ENVIRONMENT method calls have been executed to obtain the defined SGs and LUNs from the database 139. Comments are inserted in lines denoted with the "&" for readability.

```
:
:
<ENVIRONMENT>
  <SCRIPT NAME="VAFeatHasVA.xml"/>   &NOTE THE SCRIPT
NESTING
&
& This filter selects the desired SG object from those defined in the
& environment as obtained from the database 139 and matching the
SG as specified in the memory context tree.
&
```

-continued

```
  <FILTER>
    <OPERATOR NAME="EQUALS">
      <PROPERTYREF>
        <ENVREF TYPE="PROPERTY" CLASSNAME=
        "STORAGEGROUP" PROPERTY="Name" />
      </PROPERTYREF>
      <PROPERTYREF>
        <CONTEXT name="STORAGEGROUP" type="CLASS">
          <CONTEXT name="Name" type="PROPERTY"/>
        </CONTEXT>
      </PROPERTYREF>
    </OPERATOR>
  </FILTER>
</ENVIRONMENT>
<ENVIRONMENT>
  <SCRIPT NAME="SubsystemHasLUN.xml"/>
&
& This filter selects the LUN objects from those defined in the environment
& as obtained from the database 139 and matching the one or more LUNs
specified in the memory context tree
  <FILTER>
    <OPERATOR NAME="EQUALS">
      <PROPERTYREF>
        <ENVREF TYPE="PROPERTY" CLASSNAME="LUN"
        PROPERTY="LUNNumber" />
      </PROPERTYREF>
      <PROPERTYREF>
        <CONTEXT name="STORAGEGROUP" type="CLASS">
          <CONTEXT name="LUN" type="CLASS">
            <CONTEXT name="LUNNumber" type="PROPERTY"/>
          </CONTEXT>
        </CONTEXT>
      </PROPERTYREF>
    </OPERATOR>
  </FILTER>
</ENVIRONMENT>
&
& Referencing the selected filtered SG object and selected one or more
& filtered LUN objects, a method call is executed to perform a put to
& database 139 to add the LUN objects to the SG object.
<EXECUTE>
  <METHODCALL NAME="AddLUNs" >
    <INSTANCENAMEREF>
      <ENVREF TYPE="INSTANCENAME" CLASSNAME=
      "STORAGEGROUP" />
    </INSTANCENAMEREF>
    <PARAMREF NAME="lunList" TYPE="EV_LUN" ARRAY=
    "true">
      <ENVREF TYPE="CLASS" CLASSNAME="LUN" />
    </PARAMREF>
  </METHODCALL>
</EXECUTE>
```

In one embodiment as described above, one or more environment blocks may be used in connection with obtaining all objects needed for the one or more put operations as may be performed in subsequent one or more execution blocks. The objects obtained by the environment may be referenced, along with items from the memory context tree, in the execution blocks. Any one or more different techniques and defined interfaces may be used in connection with retrieving objects from the database 139 for use in an environment block. Items from the memory context tree as well, as objects of the environment may also be referenced in an environment block as well as an execution block in accordance with the particular processing performed by the script. In one embodiment, the database 139 may be in an initial state at the start of duplication processing. The initial state may be one in which the database 139 includes at least objects for the physical components in the data storage system such as, for example, an array object, disk objects, and the like. The database 139 may be in any one of a variety of different initial states which may also include some logical configuration information.

Figure 8A:
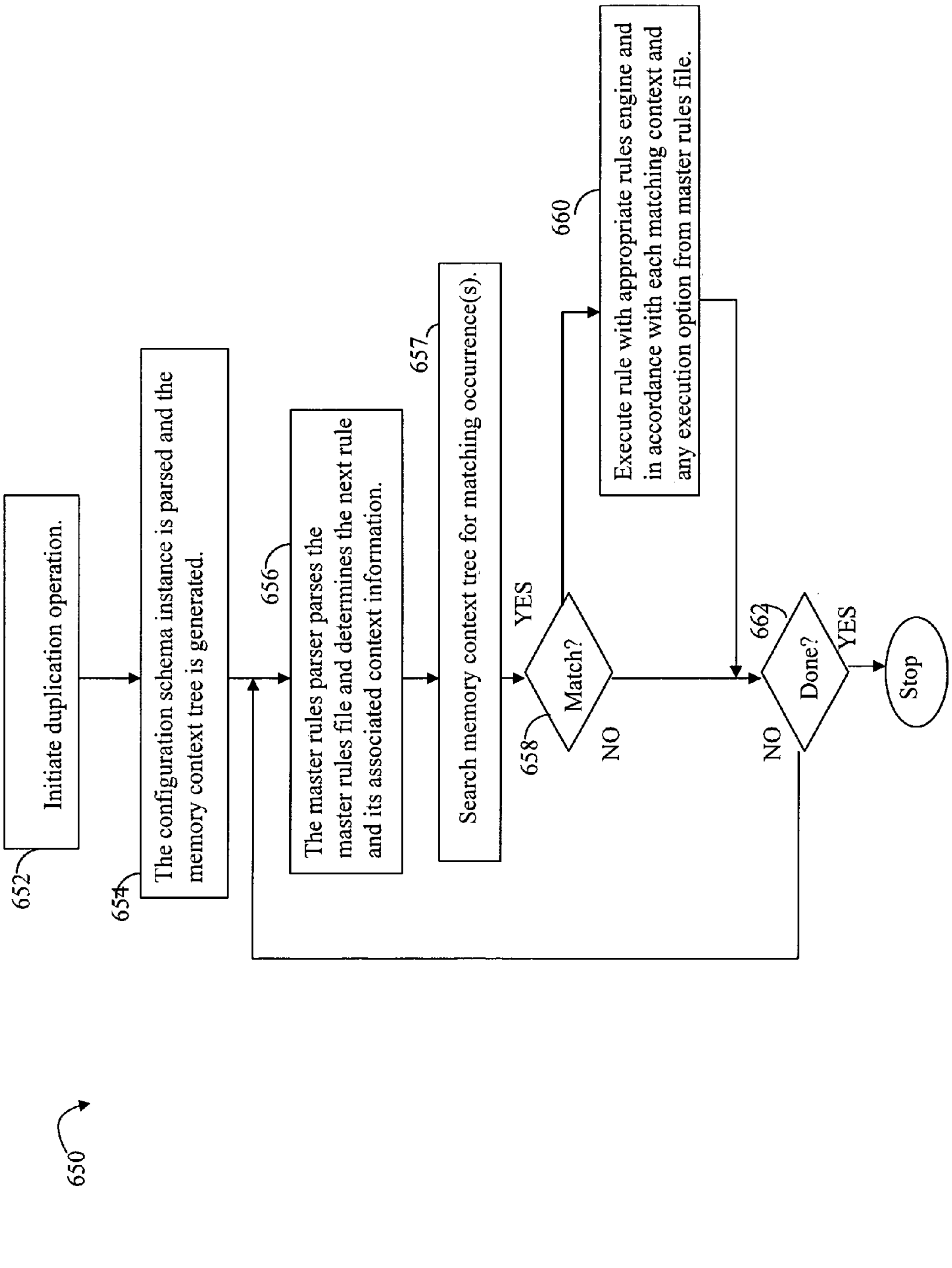
FIG. 8A is a flowchart of processing steps that may be performed in an embodiment in connection with duplication processing using the components illustrated in FIG. 7.

Referring now to FIG. 8A, shown is flowchart of processing steps that may be performed in an embodiment as part of duplication processing. The flowchart 650 generally summarizes processing described herein in connection with the components of the example 600 of FIG. 7. At step 652, duplication and operation processing is initiated. This may be performed, for example, using APIs which issue commands to the duplication engine to initiate duplication processing. At step 654, the configuration schema instance is parsed in the memory context tree is generated. At step 656, the master rules parser parses the master rules file and determines the next rule and associated context information. At step 657, memory context tree is searched for any matching occurrences for the current rule and associated context information. As described elsewhere herein, a match is determined by determining a matching context such as in accordance with the one or more elements and associated hierarchical location. At step 658, a determination is made as to whether a match exists between the current rule and the memory context tree. If step 658 evaluates to yes, control proceeds to step 660 to execute the rule with the appropriate rules engine and in accordance with the context information. Additionally, step 660 is performed in accordance with any execution option as may be specified in the master rules file. For example, as illustrated elsewhere herein, the master rules file may include an option to mark a rule to be executed only in accordance with the first matching occurrence in the configuration schema instance file. As described elsewhere herein, step 660 may result in performing one or more operations to retrieve information from and/or update the database 139. Additionally, step 660 may result in execution of multiple scripts in the event an embodiment utilizes XML-based scripts with nesting for rule implementation. Following step 660, control proceeds to step 662 where a determination is made as to whether the master rules file processing is complete. If so, processing stops. Otherwise, control proceeds from step 662 to step 656 with the next rule from the master rules file. If step 658 evaluates to no, control proceeds directly to step 662 skipping the current rule.

What will now be described is an example illustrating the duplication processing described herein as may be performed in an embodiment for the following portion as may be included in a master rules file:

```
<object name = "logical">
  <object name = "LUNs">
    <object name ="LUN">
      <handler name = "DefineLun.xml", type= "script">
    </object>
  </object>
</object>
```

Figure 8B:
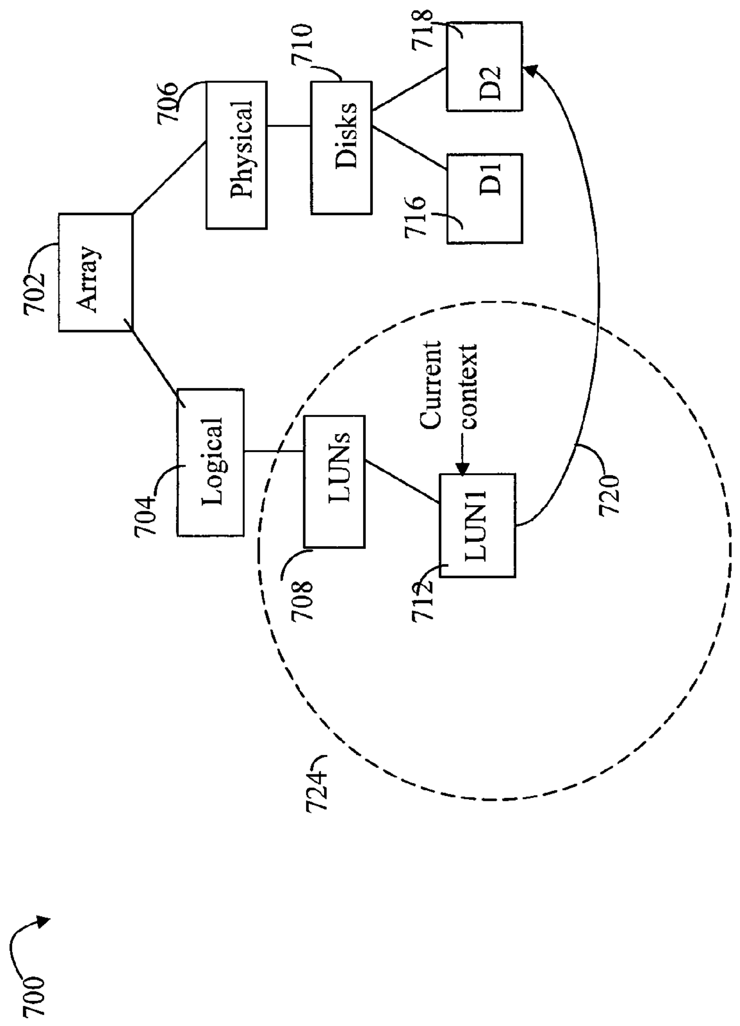
FIG. 8B is an example representation of information as may be defined in an object database of a source data storage system.

Referring now to FIG. 8B, shown is an example representation of information as may be defined in an object database of a source data storage system. The example 700 includes a logical portion 724 which may be represented using the above-referenced portion as included in a configuration schema instance. The configuration schema instance may be generated using the techniques described herein for capture processing as performed by the capture engine. The object database 139 of the destination data storage system may include objects for the physical components as represented by 702, 706, 710, 716 and 718, and the logical object 704. However, no logical configuration information is yet included in the database 139. Duplication processing may be performed using the techniques described in connection with the components of 600 of FIG. 7 to include logical configuration information in the database 139.

Following is an example of what may be included in a configuration schema instance for portion 724 in which LUN1 is defined as being physically located on disk D2:

```
<Array>
  <logical>
    <LUNs>
      <LUN1>
        :
        <Location =D2 ... >
        :
      </LUN1>
    </LUNs>
  </logical>
</Array>
```

The configuration schema parser 602 inputs and parses the configuration schema instance and represents the parsed input in the form of a memory context tree 604. In one embodiment as described herein, the tree 604 may be stored in memory referenced during execution of the components of FIG. 7. The memory context tree 604 may be as represented by nodes 704, 708, and 712 of the example 700. In the memory context tree 604, the physical location of the LUN may be stored as a property of the LUN1 object of the tree 604. The master rules parser 212 reads the object tag in the master rules file specifying the object tag for the XML tag element LUN as may be included in the configuration schema instance under the LOGICALS\LUNs tag and determines the next rule is DefineLun.XML. The rule file in this example is an XML script, DefineLun.xml, which is executed for each occurrence of the LUN tag as included in the configuration schema instance. The master rules parser 212 determines that there is a match in the memory context tree 604 for the LUN tag. In this example, there is only a single instance for LUN1 so the DefineLun.xml script is executed by the XML script rules engine 220*a* once for LUN 1.

Figure 9:
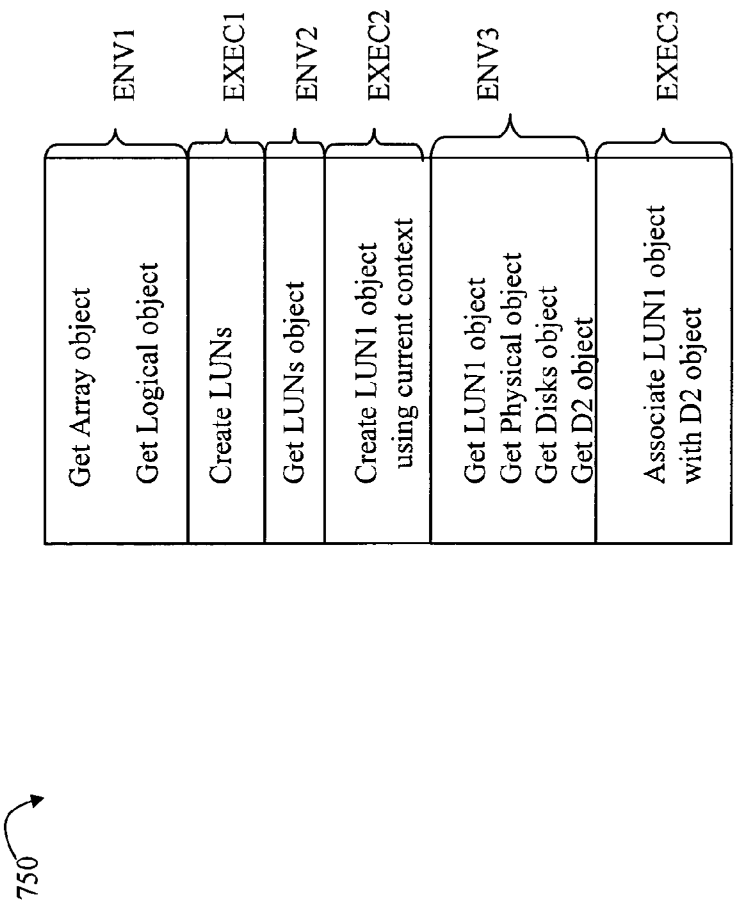
FIG. 9 is an example representation of what may be performed by a rule which is implemented as an XML script.

Referring now to FIG. 9, shown is an example representation of operations that may be performed by an embodiment of the DefineLun.xml rule file. Each occurrence of "ENVx" in the example 750 may represent one or more environment blocks as may be formed using the ENVIRONMENT tag described elsewhere herein. Each occurrence of "EXECx" in the example 750 may represent one or more execution blocks as may be formed using the EXECUTION tag described elsewhere herein.

In an embodiment, the current context may be maintained as part of state information within the duplication engine. When processing is performed in connection with a particular portion of the memory context tree, the duplication engine may maintain as a'state variable a current context identifying the current portion of the memory context tree for which rule execution is being performed. When utilizing script language elements which reference objects from the memory context tree (e.g., CONTEXTREF), the language elements may reference an object from the context tree utilizing the current context. In the event that a particular item for which a search is being performed does not exist in the current context, a search may be performed relative to the current context using a defined order. For example, when searching for a particular object or property, the search may begin with the current context and then move up the tree to the parent node of the current context. The particular order in which a search is performed for a particular context reference from the memory context tree may vary with embodiment. The script may reference particular instances using various scripting language elements. For example, the script may reference an instance using scripting language elements causing the rule execution engine to retrieve a value from anywhere in the context tree. For example, the script may cause the rule execution engine to go to the parent of a current context. The parent may be a RAIDGroup element and the script may include statements causing the rule execution engine to obtain the parent instance's RAIDGroup ID Property. By default, the rule execution engine may look only to the current context for particular values. In connection with instances stored in the environment, scripting language elements such as ENVREF in combination with FILTERs may be used to retrieve a particular instance in the environment. In the event that more than one object in the environment meets the specified FILTER criteria, an embodiment may define a default behavior such as, for example, to return all object instances meeting the criteria, the last referenced object meeting the criteria, and the like.

In the example 750, the environment block ENV1 may get the Array object 702 from the database 139 using a first method call or other API and returning the object 702 to the environment. The object 702, as well as other objects returned to the environment, may be subsequently referenced as an environment object (e.g. using ENVREF). A second method call may be made using the Array object 702 as an input parameter. It should be noted that using the techniques described herein, ENV1 may include 2 execution blocks defined by two EXECUTION tags, one for each method call. The second method call may result in returning to the environment the logical object 704 from the database 139. Using the logical object 704 as an input parameter, the execution block EXEC1 may use a third method call which creates a LUNs object instance 708 and stores it in the database 139 with the appropriate hierarchical relationships. The environment block ENV2 may get and return to the environment the LUNs object 708. The execution block EXEC2 may create a LUN1 object 712 in the database 139 using as a first input parameter the LUNs object 708 and specifying other LUN1 information, such as the name "LUN1", as other input parameter data. The LUN 1 information may be specified using information from the memory context tree (e.g., by using a CONTEXTREF tag in the XML script). In order to complete the association as represented by 720, ENV3 environment blocks may be executed. It should be noted that ENV3 may include 4 environment blocks defined using 4 ENVIRONMENT tags, one for each method call corresponding to a get operation to retrieve information from the database 139. A first method call may be performed to get the LUN1 object created in EXEC2. A second method call may be performed using the array object 207 as an input parameter to return object 706 physical to the environment. A third method call may be performed using the object 706 as an input parameter to return the object 710 disks to the environment. A fourth method call may be performed using the object 710 as the input parameter to return object 718 D2 to the environment. In the execution block EXEC3, a method call may be performed to update the database 139 to associate LUN1 object 712 with D2 object 718.

For each of the foregoing method calls scripting language elements, such as ENVREF, may be used to reference particular objects read from the database 139 and returned to the environment. As illustrated herein, such references may be made in connection with subsequent method calls in EXECUTION blocks, and the like.

As described herein, an embodiment may implement rules using a variety of different techniques. As illustrated herein, a rule may be implemented using one or more XML scripts. A rule may also be implemented using C++. In one embodiment, rules may be implemented using one or more C++ classes. The name of a class factory for each rule may be registered with the duplication engine at compile time of the duplication engine. Multiple rules, such as a same grouping of related rules, may specify the same class factory. When the master rules parser encounters a rule of type "class", indicating a C++-based rule implementation, a factory instance is created. The factory instance creates a rule object that performs processing for that rule for the current context. One advantage of using C++-based rule implementation over XML-based scripts is that the C++-based implementation may utilize the richness of the C++ language as opposed to the XML scripting language. However, C++-based rule implementations as described herein differ from the XML scripting in that when a change is made to the rule, the code for implementing the rule and duplication engine is recompiled. Such a step of recompilation is not needed in the case of using XML scripts.

An embodiment of the duplication engine may also perform caching of scripts, for example, as an optimization, if a same script is executed multiple times.

What will now be described is utilization of the techniques described herein in connection with providing rollback functionality to rollback or undo operations performed by the duplication engine. In one embodiment, the use of rollback functionality may be initiated, for example, when there are errors encountered during the duplication operation or when it may be otherwise desirable to rollback the database 139 to a particular point in time configuration. Rollback processing may be controlled in a manner similar to as described herein in connection with duplication processing using an API issuing commands to the components included in the data storage system. The rollback processing may utilize the duplication engine in connection with performing rollback processing.

An embodiment utilizing rollback functionality may have the duplication engine generate additional information during duplication processing. The additional information may be used as input to rollback processing performed at a later point in time. In one embodiment, the duplication engine may be enabled to perform the following processing and generate the following additional information during duplication processing. The duplication engine:

1. Marks each XML element as may be represented as a node in the memory context tree with a unique ID and saves the XML elements and associated IDs to a file referred to herein as the rollback context file. In one embodiment, a unique ID may be assigned to each node of the memory context tree. In an embodiment representing each node in the memory context tree as an object, the unique ID may be a property for each object instance corresponding to a node in the tree. This rollback context file may be created after reading in the configuration schema instance. The rollback context file, as will be illustrated in following paragraphs, may be a version of the configuration schema instance with the unique IDs for each XML element added.

2. Each time a duplication script succeeds in completing its operation, a transaction log is updated. The transaction log tracks what operations are performed for each node in the memory context tree as may correspond to XML elements from the configurations schema instance. In one embodiment, the transaction log may record the name of the script executed successfully and also record the unique ID associated with the node of the memory context tree processed by the script execution instance.

At a later point in time, the foregoing rollback context file and transaction log may be used as inputs in connection with performing rollback processing, for example, to rollback the target configuration object database 139. In one embodiment, the duplication engine components may perform rollback processing using different inputs than in connection with duplication processing.

An embodiment of the duplication engine may use the following in connection with performing the rollback:

1. The saved rollback context file. This may be used as input rather than the configuration schema instance 204 of FIG. 7.
2. The saved transaction log.
3. The rollback master rule file. (e.g., similar in structure and functionality to the master rules definitions). This may be used as an input rather than the master rule file 210 of FIG. 7. The rollback master rule file is customized for use in connection with performing a rollback or "undoing" previously performed successful operations to the object database 139. As such, the rollback master rule file may be coded so that rollback will proceed in a reverse ordering with respect to the ordering specified in the master rule file 210 for duplication processing.
4. The rollback scripts (e.g., similar in structure and purpose to the duplication scripts.) This may be used as an input rather than the rule file/scripts used in connection with duplication processing. The scripts used in connection with rollback processing may be characterized as performing complementary or reversal operations as compared to those operations performed by scripts used in connection with duplication processing. For example, as will be illustrated herein, an operation to "bind a LUN" may be performed as part of duplication processing and an operation to "unbind the LUN" may be performed as part of rollback processing.

Additional detail about the foregoing used in connection with performing rollback processing is described in following paragraphs.

For purposes of illustration, a complete example will now be described. Following is an example of a configuration schema instance as may be input to the duplication engine enabled to generate the transaction log and rollback context file as part of duplication processing.

```
<ARRAY>
  <RAIDGroups>
    < RAID group id = "1", numberofdisks = "5"/>
      <LUNs>
        <LUN number = "1" Capacity = "100GB"/>
        <LUN number = "2" Capacity = "120GB"/>
      </LUNs>
  </RAIDGroups>
</ARRAY>
```

The above describes a configuration with 1 RAIDGroup with 2 LUNs.

When the foregoing configuration schema instance is used as an input into the duplication processing components as illustrated in FIG. 7, the duplication engine enabled to generate the additional information used in connection with subsequently performing rollback processing may assign a unique ID to each XML element by adding the UniqueID attribute to each element encountered in the configuration schema instance. The duplication engine may generate the rollback context file including the unique IDs. In one embodiment, the rollback context file may be generated by the configuration schema parser 602. Below is an example of a rollback context file that may be generated as part of duplication processing based on the foregoing configuration schema instance:

```
<ARRAY UniqueID="1">
  <RAIDGroups UniqueID="2">
    <RAIDgroup UniqueID="3" id = "1", numberofdisks = "5"/>
      <LUNs UniqueID="4">
        <LUN UniqueID="5" number = "1" Capacity = "100GB"/>
        <LUN UniqueID="6" number = "2" Capacity = "120GB"/>
      </LUNs>
  </RAIDGroups>
</ARRAY>
```

As the duplication engine proceeds, the duplication engine may record operations performed in a transaction log. In one embodiment, the duplication engine may record each script instance successfully executed and the particular XML element for which the script is being executed. For each successful execution instance of a script, the script name and unique ID of the XML element for which the script execution was performed may be recorded in the transaction log. Following is an example representation of a transaction log snippet that may be generated when duplication processing is enabled to generate the additional outputs that may be used in subsequent rollback processing. The example transaction log snippet is based on the previous examples of the configuration schema instance and rollback context file:

4=Create RAIDGroup.xml

5=BindLUN.xml

6=BindLUN.xml

The first line above indicates that script Create RAIDGroup.xml was successfully run for the XML element represented by the UniqueID 4. The second line above indicates that script BindLUN.xml was successfully run for the XML element represented by the UniqueID 5. The third line above indicates that script BindLUN.xml was successfully run for the XML element represented by the UniqueID 6.

The foregoing transaction log and rollback context file may be used in subsequently performing rollback processing to "rollback" the configuration object database 139. After rollback processing is performed, the database 139 may be characterized as restored to a previous configuration information state. Rollback processing may be performed, for example, if errors were encountered in connection with duplication processing. It may then be desirable to rollback the database 139 to a state prior to commencing duplication processing.

In one embodiment, rollback processing may be performed using the duplication engine components illustrated in FIG. 7 with the inputs described elsewhere herein. As with capture processing and duplication processing, rollback processing may also be controlled using an API. The API to perform rollback processing may enable the duplication engine to execute in a rollback execution mode rather than a duplication execution mode (e.g., to perform duplication processing). When the duplication engine executes in the rollback execution mode, the duplication engine may utilize those inputs described herein in connection with rollback processing. Alternatively, when the duplication engine executes in the duplication execution mode, the duplication engine may utilize those inputs described herein in connection with duplication processing.

What will now be described in more detail are the inputs and processing performed by the duplication engine executing in the rollback execution mode.

As described above, the inputs to the duplication engine executing in rollback execution mode include: the rollback context file, the transaction log, the rollback master rule file, and the rule files/scripts used in connection with rollback processing.

The rollback master rule file may include references to rules for "undoing" previously successful operations that may be performed in connection with duplication processing. For example, duplication processing may "bind a LUN" to a particular SG, RG and the like. Rollback processing may include undoing such operations such as, for example, "unbinding the LUN". As will be described in more detail in following paragraphs, the rollback master rule file for unbinding LUN instructs the duplication engine to run the unBindLUN.xml script only if the BindLUN.xml script has been previously executed successfully for a specified LUN element. The duplication engine may determine if the BindLUN.xml script has been successfully executed by referring to the transaction log. Furthermore, the particular context of the previously successful execution may be determined by using the uniqueID to determine context information from the rollback context file.

Following is an example rollback script for performing an unbind LUN operation. An unbind LUN operation may be performed, for example, to remove LUNs from RGs or SGs. In this example, the rollback script utilizes the same language as the duplication scripts as described above. The below script may be an XML script named unBindLUN.xml. In this example, the method executed varies with the operation so that the method UnbindNumberedLun is invoked.

```
<SCRIPT>
<EXECUTION>
  <LOG DESC="Unbinding LUN: ">
    <CONTEXTREF name="LunNumber" type="PROPERTY"/>
  </LOG>
</EXECUTION >
<ENVIRONMENT CACHE="SUBSYSTEM">
  <SCRIPT NAME="Subsystem.xml"/>
</ ENVIRONMENT >
< ENVIRONMENT CACHE="RAIDGROUPFEATURE">
  <SCRIPT NAME="SubsystemHasRGFeat.xml"/>
</ ENVIRONMENT V>
< ENVIRONMENT CACHE="RAIDGROUP">
  <SCRIPT NAME="RGFeatHasRAIDGroup.xml"/>
</ ENVIRONMENT >
< ENVIRONMENT CLASSNAME="MY_RAIDGROUP">
  <FILTER>
    <OPERATOR Name="EQUALS">
      <PROPERTYREF>
        <ENVREF TYPE= "PROPERTY" CLASSNAME=
        "RAIDGROUP" PROPERTY="RAIDGroupID" />
      </PROPERTYREF>
      <PROPERTYREF>
        <CONTEXTREF name= "LUN" type="CLASS">
          <CONTEXTREF name="RAIDGROUP" type= "CLASS"
          RELATION="PARENT">
            <CONTEXTREF name="RAIDGroupID" type=
            "PROPERTY"/>
          </CONTEXTREF >
        </ CONTEXTREF >
      </PROPERTYREF>
    </OPERATOR>
  </FILTER>
</ENVIRONMENT>
< EXECUTION >
  <METHOD NAME="UnbindNumberedLun" >
    <OBJREF>
      <ENVREF TYPE="INSTANCENAME" CLASSNAME=
      "MY_RAIDGROUP" />
    </OBJREF>
    <PARAMREF NAME="LunNumber" TYPE="sint32">
```

-continued

```
    <CONTEXTREF name = "LUN" type="CLASS">
      <CONTEXTREF name="LunNumber" type="PROPERTY"/>
    </CONTEXTREF>
  </PARAMREF>
 </METHOD>
</ EXECUTION >
</SCRIPT>
```

In the foregoing example, the script language element ENVIRONMENT CACHE option may be used in connection with a script executed multiple times in accordance with the number of elements in the memory context tree. The ENVIRONMENT CACHE option causes enumerated objects in the environment to be cached or stored for all instances of execution of the script. Without use of this option, any objects of the environment are not maintained from one execution of the same script to subsequent executions of the same script. In this example, the SUBSYSTEM in the environment is cached meaning that this object will not be removed from the "scratch pad" (e.g., environment) when the script execution stops. When the same script is executed again, use of the ENVIRONMENT CACHE option causes retrieval of the subsystem object from the cache. The ENVIRONMENT CACHE option may be used, for example, as an alternative to retrieving the object from the target configuration object database 139.

It should also be noted that the use of OBJREF in the foregoing example script indicates that the called method refers to a particular object instance.

In one embodiment, the rollback master rule file is similar in functionality to the duplication master. The rollback master rule file may define the following:

1. The order in which rollback operations and rules are executed.
2. Under what context the rules are to be executed.
3. How the rules are implemented (e.g., XML Script, C++ class, etc.).
4. Under what conditions the rules are executed.

Below is an example snippet from a rollback master rule file as may be used in connection with a rollback operation. The example below illustrates how the above mentioned items may be implemented in a rollback master rule file. In this example illustration, the rollback master rule file indicates an ordering in accordance with unbinding the LUNs from a RG and then destroying the RG. The rule for unBindLUN is implemented in this example as an XML script (e.g., Un BindLUN.xml) above and has an appropriate type attribute with the HANDLER tag below.

```
<OBJECT NAME="STORAGEGROUPs">
  <OBJECT NAME="STORAGEGROUP">
    <HANDLER NAME="RemoveLUNFromVA.xml" TYPE=
    "SCRIPT">
      <REQMNT NAME="AddLUNToVA.xml"/>
    </HANDLER>
      <HANDLER NAME="PollSubsystem.xml" TYPE="SCRIPT"
      EXECOPTION="EXECONCE"/>
      <HANDLER NAME="DestroyStorageGroup.xml" TYPE=
      "SCRIPT">
            <REQMNT NAME="CreateStorageGroup.xml"/>
      </HANDLER>
  </OBJECT>
</OBJECT>
<OBJECT NAME="RAIDGROUPs">
  <OBJECT NAME="RAIDGROUP">
    <OBJECT NAME="LUNs">
```

-continued

```
      <OBJECT NAME="LUN">
        <HANDLER NAME="Un BindLUN.xml" TYPE="SCRIPT">
          <REQMNT NAME=" BindLUN.xml"/>
        </HANDLER>
      </OBJECT>
    </OBJECT>
  <HANDLER NAME="PollSubsystem.xml" TYPE="SCRIPT"
  EXECOPTION="EXECONCE"/>
    <HANDLER NAME="DestroyRAIDGroup.xml" TYPE=
    "SCRIPT">
      <REQMNT NAME="CreateRAIDGroup.xml"/>
    </HANDLER>
  </OBJECT>
</OBJECT>
```

The above example includes a script language option of REQMNT that may be used in connection with HANDLERs. As discussed above, the HANDLERs may specify the script name and type. The REQMNT option in connection with a HANDLER for rollback processing may be used to specify the complementary operation for the processing performed by the associated HANDLER. For example, the HANDLER UnBindLUN may have BindLUN specified with the REQMNT option. The REQMNT option causes the duplication engine to determine if the specified complementary operation was successfully performed using the transaction log file. If the complementary operation (e.g., BindLUN) was successfully performed as part of previous duplication processing, the rollback processing continues by executing the rule indicated with the associated HANDLER (e.g., unBindLUN). Otherwise, an error occurs and the rule indicated with the associated HANDLER is not executed.

The above rollback master rule file defines the following:

1. Script RemoveLUNFromVA.xml is executed if AddLUNToVA.xml has been executed successfully in the given context (StorageGroups\storagegroup). It derives this information from the transaction log file.
2. The script poll subsystem.xml is executed. There are no requirements for executing pollSubsystem.xml and this script is executed if there is a matching context in the context tree having the hierarchy (STORAGEGROUPS\STORAGEGROUP).
3. Script DestroyStorageGroup.xml is executed if CreateStorageGroup.xml has been executed successfully as determined in accordance with the transaction log file.
4. The script UnBindLUN.xml is executed if the script BindLUN.xml was previously successfully executed during duplication as determined in accordance with the transaction log file. If there are any occurrences of "BindLUN" script executions in the transaction log, processing proceeds with obtaining the associated unique ID for each instance in the transaction log. Using the unique ID, the memory context tree previously constructed using the rollback context file is traversed to determine the appropriate corresponding context (e.g., node in the tree). In one embodiment, the memory context tree constructed in connection with rollback processing is similar to that as described in connection with duplication processing with each node also having an associated unique ID. Once the corresponding context from the memory context tree is determined for the uniqueID, the unBindLUN script is executed with the corresponding context as the current context.
5. The script poll subsystem.xml is executed. There are no requirements for executing pollSubsystem.xml and this script is executed if the context has the hierarchy (RAIDGROUPS|RAIDGROUP) defined.

6. The script Destroy RAIDGroup.xml is executed if the script Create RAIDGroup xml was successfully executed during duplication as determined in accordance with the transaction log.

As described above, the transaction log file from previous duplication processing includes a list of which scripts are executed for a given context so that the same context can be utilized in connection with rollback scripts.

Figure 10:
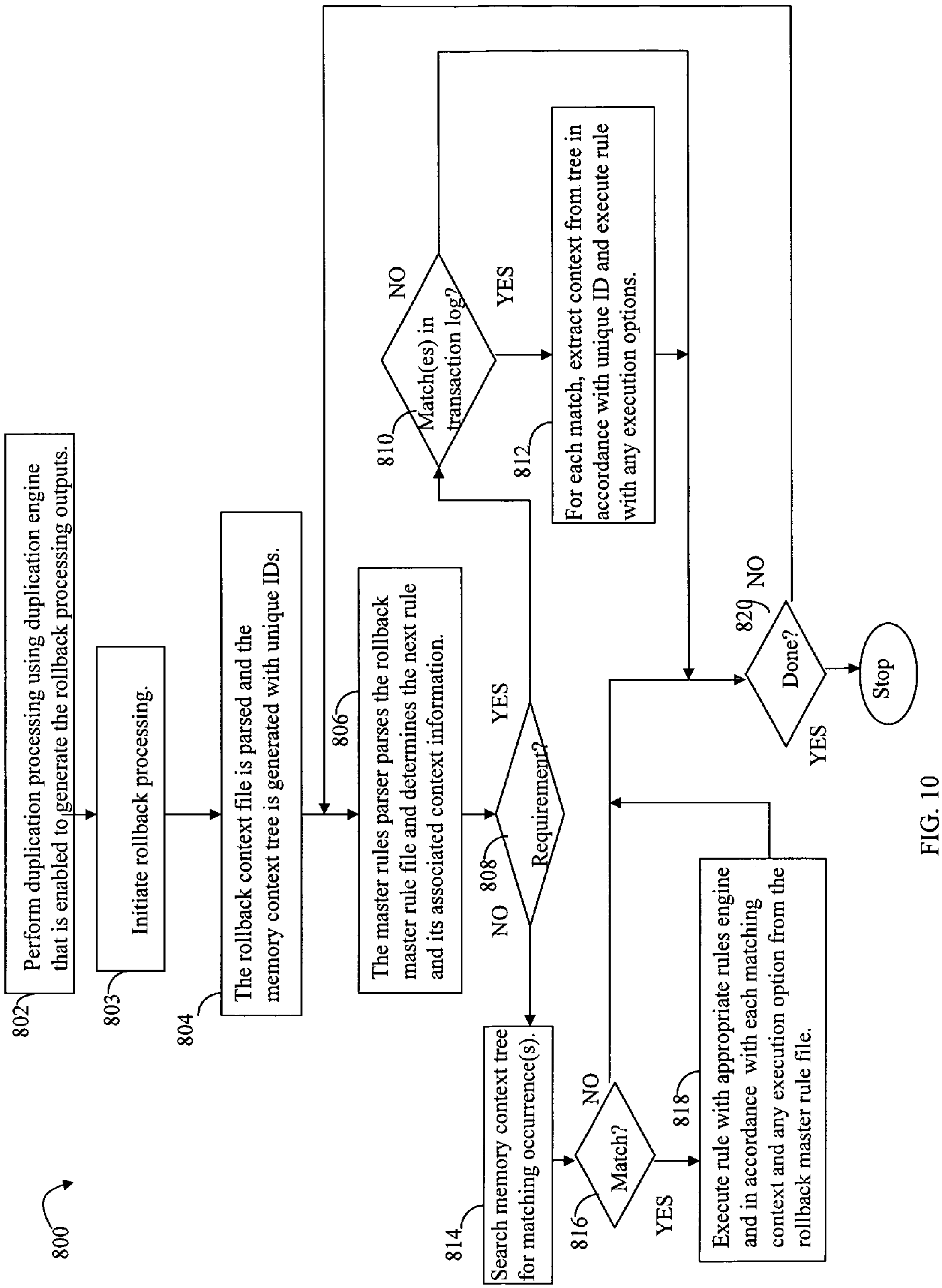
FIG. 10 is a flowchart of processing steps that may be performed in an embodiment in connection with rollback processing.

Referring now to FIG. 10, shown is a flowchart of processing steps that may be performed in an embodiment in connection with performing rollback processing using the techniques described herein. The steps of the flowchart 800 summarize processing just described. At step 802, duplication processing is performed in which the duplication engine is enabled to generate the rollback processing outputs. In one embodiment described herein, these outputs include the transaction log file and the rollback context file. At step 803, rollback processing may be initiated. As described herein, step 803 may be performed at some point in time after duplication processing. Step 803 may be performed, for example, in response to detecting an error in connection with duplication processing. At step 804, the rollback context file is parsed and the memory context tree is generated as described in connection with duplication processing. The memory context tree constructed in step 804 also includes the additional uniqueIDs as generated for each node in the tree to uniquely identify each node associated with an XML element from the rollback context file. At step 806, the master rules parser parses the rollback master rule file and determines the next rule and associated context information. At step 808, a determination is made as to whether a requirement is specified in the master rule file for the next rule occurring in the master rule file.

If step 808 evaluates to yes, control proceeds to step 810. Recall that the requirement option may be specified in connection with rollback processing to indicate a complementary operation. Use of the requirement option causes the duplication engine to perform processing to determine if the complementary option indicated by the requirement option was successfully performed during previous duplication processing. This is determined by examining the transaction log at step 810 and determining whether there are one or more matches for the complementary operation in the transaction log. If not, control proceeds to step 820. If step 810 evaluates to yes, control proceeds to step 812 where processing is performed for each matching complementary operation occurrence in the transaction log. At step 812, for each match in the transaction log, the corresponding context is extracted from the context tree in accordance with the unique ID (e.g., unique ID from transaction log matches unique ID of node in tree to find matching context). The current rule is executed with the appropriate rules engine using the matching context from the context tree along with any execution options that may be specified in the rollback master rule file. From step 812, control proceeds to step 820.

If step 808 evaluates to no indicating no special requirements, control proceeds to step 814 where the memory context tree is searched for any matching occurrence(s). It should be noted that step 814 processing is similar to step 657 of FIG. 8A. Control proceeds to step 816 where a determination is made as to whether there are any matches between the current rule and its associated context and with a node in the context tree. If step 816 evaluates to no, control proceeds to step 820. If step 816 evaluates to yes, control proceeds to step 818 where the rule is executes with the appropriate rules engine for each matching context and any execution option from the rollback master rule file. From step 818, control proceeds to step 820.

At step 820, a determination is made as to whether processing of all rules in the rollback master rule file is complete. If so, processing stops. Otherwise, control proceeds to step 806 with the next rule in the rollback master rule file.

In connection with the flowchart 800 of FIG. 10, it should be noted that if step 808 evaluates to no, the processing performed at steps 814, 816 and 818 is similar to that performed, respectively, at step 657, 658, and 660 of flowchart 650 of FIG. 8A in connection with duplication processing.

In connection with the duplication engine, an option may be used to enable/disable generation of the transaction log file and rollback context file that may be subsequently used in connection with rollback processing. Another option may be used to determine the execution mode of the duplication engine. As described herein, the duplication mode may execute in a first execution mode to perform duplication processing, or a second execution mode to perform rollback processing. Depending on which execution mode is specified, the duplication engine utilizes particular inputs and performs specific execution mode processing as described herein.

As described herein, the requirements option (e.g., REQMNT) may be used in connection with rollback processing in the rollback master rule file to indicate complementary operations. An embodiment may also have multiple requirements for a single rollback operation to be performed. The requirement option may be characterized as a mechanism for specifying preconditions which should be determined to exist prior to execution of a particular rollback processing operation performed by a rule file or script. Other requirements that may be specified in an embodiment may include, for example, determining if one or more expected objects are defined in the target configuration object database 139.

The environment as described herein may be characterized as an area which may be loaded with objects used in subsequent processing. As described herein, objects may be cached in an environment associated with a script so that the same cached object(s) are defined or loaded with subsequent executions of the same script. In other words, the cached object is loaded into the environment associated with the next execution instance of the same script. Objects from the context tree may also be loaded into the environment. In one embodiment, the current context may be automatically loaded into the environment associated with a script.

It should be noted that the various components used in connection with the techniques described herein may be implemented using hardware and/or software. For example, the components of the capture engine and/or duplication engine may be written in any one or more programming and/or scripting languages such as, for example, C++, Java, and XML.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for generating a configuration schema instance comprising:

receiving a layout file specifying what portion of configuration information is to be extracted from a configuration data store;

extracting said portion of configuration information from said configuration data store in accordance with said layout file, said layout file including an association between a first configuration category as an input class and a second configuration category as a result class, said association corresponding to an application programming interface which is invoked in said extracting for an instance of said input class and extracts one or more instances of said result class from said configuration data store; and storing a representation of said portion of configuration information in said configuration schema instance, wherein said layout file and said configuration schema instance include logical configuration information and physical configuration information describing at least a partial configuration of a data storage system, said physical configuration information describing one or more physical storage devices of the data storage system, said logical configuration information describing at least one logical unit of storage and at least one of a RAID group and a storage group, said RAID group including said at least one logical unit of storage and said one or more physical storage devices, said storage group including said at least one logical unit of storage.

2. The method of claim 1, wherein said layout file and said configuration schema instance have a structured hierarchical format in accordance with a defined hierarchy of configuration categories of configuration information included in said configuration data store, said configuration categories including said first configuration category and said second configuration category.

3. The method of claim 2, wherein at least a portion of the configuration categories of said defined hierarchy are used in connection with said logical configuration information and said physical configuration information of the data storage system.

4. The method of claim 1, wherein said layout file includes properties of instances to be extracted from said configuration data store.

5. The method of claim 2, wherein said layout file and said configuration schema instance include tags associated with categories of said hierarchy, said hierarchy being represented as a tree-like structure, categories of said hierarchy which are at different levels being represented in said layout file and said configuration instance using nested tags.

6. The method of claim 5, wherein said configuration schema instance includes configuration information identifying instances of a category from said configuration data store having a first hierarchical context in accordance with a tag included in said layout file, and wherein said tag is associated with said category and has a second hierarchical context matching said first hierarchical context.

7. A method for configuring a target data store comprising:

extracting information from a source data store in accordance with a layout file, said layout file including an association between a first configuration category as an input class and a second configuration category as a result class, said association corresponding to an application programming interface which is invoked in said extracting for an instance of said input class and extracts one or more instances of said result class from said source data store;

generating a schema instance describing said information to be included in said target data store, wherein said schema instance includes logical configuration information and physical configuration information describing at least a partial configuration of a first data storage system, said physical configuration information describing one or more physical storage devices of the first data storage system, said logical configuration information describing at least one logical unit of storage and at least one of a RAID group and a storage group, said RAID group including said at least one logical unit of storage and said one or more physical storage devices, said storage group including said at least one logical unit of storage;

parsing a master rules file including one or more rules;

determining, for each of said one or more rules, whether there is an element included in said schema instance having a context that matches a context for said each rule;

if there is an element in said schema instance having a context that matches a context for said each rule, executing said each rule in accordance with a context of said element in said schema instance; and performing operations on said target data store in accordance with said each rule to update said target data store in accordance with said schema instance.

8. The method of claim 7, wherein said target data store includes configuration information for a second data storage system and said schema instance describes configuration information to be included in said target data store for the second data storage system.

9. The method of claim 7, wherein said determining whether there is an element included in said schema instance having a context that matches a context for said each rule further includes:

determining whether a first hierarchical context of said each rule matches a second hierarchical context of said element.

10. The method of claim 9, wherein said executing said each rule in accordance with a context of said element in said schema instance includes executing said each rule using information associated with said second hierarchical context of said element and data associated with said element.

11. The method of claim 8, wherein said schema instance is generated using a capture engine to capture a portion of configuration information from a source configuration data store for the first data storage system for duplication in said target data store for the second data storage system in accordance with said layout file indicating which portion of said configuration information is to be captured and represented in said schema instance.

12. The method of claim 7, wherein said one or more rules each have a corresponding rule file and executing a rule includes utilizing a particular rules engine selected in accordance with a type of said rule file.

13. The method of claim 12, wherein a rule file may be implemented using a programming language or a scripting language.

14. A computer readable medium comprising code stored thereon for generating a configuration schema instance, the computer readable medium comprising code that:

receives a layout file specifying what portion of configuration information is to be extracted from a configuration data store, said layout file including an association between a first configuration category as an input class and a second configuration category as a result class, said association corresponding to an application programming interface which is invoked in said extracting for an instance of said input class and extracts one or more instances of said result class from said configuration data store;

extracts said portion of configuration information from said configuration data store in accordance with said layout file; and stores a representation of said portion of configuration information in said configuration schema instance, wherein said layout file and said configuration schema instance include logical configuration information and physical configuration information describing at least a partial configuration of a data storage system, said physical configuration information describing one or more physical storage devices of the data storage system, said logical configuration information describing at least one logical unit of storage and at least one of a RAID group and a storage group, said RAID group including said at least one logical unit of storage and said one or more physical storage devices, said storage group including said at least one logical unit of storage.

15. The computer readable medium of claim 14, wherein said layout file and said configuration schema instance have a structured hierarchical format in accordance with a defined hierarchy of configuration categories of configuration information included in said configuration data store, said configuration categories including said first configuration category and said second configuration category.

16. The computer readable medium of claim 15, wherein at least a portion of the configuration categories of said defined hierarchy are used in connection with said logical configuration information and said physical configuration information of the data storage system.

* * * * *